(12) United States Patent
Kanaya et al.

(10) Patent No.: US 6,482,256 B1
(45) Date of Patent: Nov. 19, 2002

(54) INK SETS

(75) Inventors: Miharu Kanaya, Nagano-ken (JP); Jun Ito, Nagano-ken (JP); Hiroshi Fukumoto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/560,466

(22) Filed: Apr. 28, 2000

(30) Foreign Application Priority Data

| Apr. 28, 1999 | (JP) | 11-121672 |
| Jun. 7, 1999 | (JP) | 11-159898 |
| Mar. 9, 2000 | (JP) | 2000-064976 |
| Apr. 20, 2000 | (JP) | 2000-119862 |

(51) Int. Cl.$^7$ ............................................. C09D 11/00
(52) U.S. Cl. ................. 106/31.51; 106/31.47; 106/31.48; 106/31.49; 106/31.52
(58) Field of Search .................... 106/31.51, 31.47, 106/31.48, 31.49, 31.52

(56) References Cited

U.S. PATENT DOCUMENTS

| 5,534,051 A | * | 7/1996 | Lauw | 106/31.43 |
| 5,536,306 A | * | 7/1996 | Johnson et al. | 106/31.49 |
| 5,599,386 A | | 2/1997 | Sano | 106/31.48 |
| 5,900,899 A | | 5/1999 | Ichizawa | 347/100 |

FOREIGN PATENT DOCUMENTS

| EP | 0692527 | 1/1996 | |
| EP | 0867484 | 9/1998 | |
| EP | 0878522 | 11/1998 | |
| EP | 0 927 747 | 7/1999 | C09B/5/14 |
| JP | 01(1989)-55248 | 3/1989 | B41J/3/04 |
| JP | 02(1990)-127482 | 5/1990 | C09D/11/00 |
| JP | 09(1997)-76623 | 3/1997 | B41M/5/00 |
| JP | 10(1998)-120926 | 5/1998 | C09D/29/30 |

OTHER PUBLICATIONS

JPO Abstract 10(1998)–55248, Mar. 2, 1989.
JPO Abstract 02(1990)–127482, May 16, 1990.
JPO Abstract 09(1997)–76623, Mar. 25, 1997.
JPO Abstract 10(1998)–120926, May 12, 1998.

* cited by examiner

Primary Examiner—Helene Klemanski
(74) Attorney, Agent, or Firm—Ladas & Parry

(57) ABSTRACT

An ink set is provided which can realize images having excellent lightfastness and color reproduction. The ink set comprises magenta ink compositions, the magenta ink compositions containing specific compounds as colorants.

28 Claims, 1 Drawing Sheet

INK SETS

BACKGROUND OF THE INVENTION

1. Field of the Invention

The present invention relates to color ink sets having excellent color reproduction and lightfastness.

2. Background Art

In general, images produced by ink compositions, when exposed to indoor or outdoor light beams, the open air and the like for a long period of time, are frequently deteriorated due to an influence of ultraviolet light, visible light, various gases contained in the air or the like. In particular, in the case of color images produced by a plurality of ink compositions, the presence of even one color ink composition having poor lightfastness causes a change in hue of images, resulting in extremely deteriorated quality of color images. This has led to a demand for ink compositions capable of yielding highly weathering-resistant images which, even when stored for a long period of time, are less likely to be deteriorated.

Further, in recent years, attention has been drawn to ink jet recording. The ink jet recording is a printing method wherein droplets of an ink composition are ejected and deposited onto recording media, such as paper, to conduct printing. This method has a feature that images having high resolution and high quality can be printed at a high speed by means of relatively inexpensive apparatuses. Ink jet recording apparatuses utilizing this method are commercially widely accepted by virtue of good print quality, low cost, relatively quiet operation, and graphics-forming capability. Among others, thermal (bubble jet) and piezoelectric drop-on-demand printers have been very successful on the market, and have been widely used as printers for personal computers for office and domestic applications.

In recent years, a method has become used wherein a plurality of color ink compositions are provided and used in the formation of color images by ink jet recording. In general, color images are formed using three colors of a yellow ink composition, a magenta ink composition, and a cyan ink composition, and optionally four colors of the above three color compositions plus a black ink composition. In some cases, six colors of the above four colors plus a light cyan ink composition and a light magenta ink composition are used in the formation of color images. What is required of ink compositions for the formation of such color images is that they as such can exhibit good color development and, in addition, when used in combination with a plurality of ink compositions, can develop good intermediate colors.

Further, ink compositions constituting ink sets used in this ink jet recording are required to have properties such that they have suitable property values, such as proper viscosity and surface tension values, have high optical density, can yield sharp color tone and images, can yield images having excellent fastness properties, such as excellent waterfastness and lightfastness, have excellent storage stability, are less likely to cause nozzle clogging, and are free from problems associated with an odor and safety. In order to satisfy a large part of these property requirements, water-base inks prepared by dissolving water-soluble dyes in water or in a mixed solution of water and a water-soluble organic solvent are used. At that time, ink compositions having various hues are prepared from dyes having various hues.

Various image properties, such as color tone, lightfastness, and waterfastness, are greatly influenced by the properties of colorants in the ink compositions, and various dyes have hitherto been studied in the art.

SUMMARY OF THE INVENTION

The present inventors have now found that ink sets comprising a combination of specific color ink compositions can realize images having excellent color reproduction and, at the same time, having excellent lightfastness. The present invention has been made based on such finding.

Accordingly, it is an object of the present invention to provide an ink set which can realize images having excellent lightfastness and color reproduction.

Thus, according to one aspect of the present invention, there is provided a magenta ink set comprising two magenta ink compositions different from each other in color density, a magenta ink composition with higher color density and a magenta ink composition with lower color density, said magenta ink composition with higher color density containing as a colorant a compound represented by formula (III)

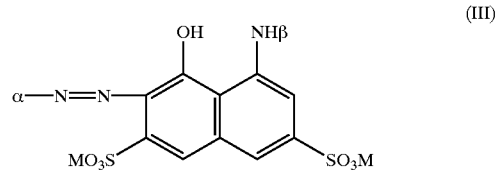

wherein

α represents a $C_1$–$C_4$ alkyl or alkoxy group or an OH—, $SO_3H$—, or COOM-substituted phenyl or naphthyl group;

β represents a hydrogen atom or a group represented by formula

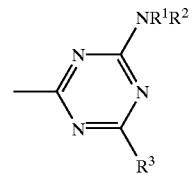

wherein $R^1$ represents a hydrogen atom or an OH— or COOH-substituted $C_1$–$C_4$ alkyl group, $R^2$ represents an OH—, $OCH_3$—, $OC_2H_5$—, $SO_3M$—, or COOM-substituted $C_1$–$C_4$ alkyl or phenyl group, and $R^3$ represents an OH, COOH, or $NHR^4$ wherein $R^4$ represents an $SO_3M$— or COOH-substituted $C_1$–$C_4$ alkyl group; and M represents a hydrogen atom, lithium, sodium, potassium, ammonium, or an organic amine, said magenta ink composition with lower color density containing as a colorant a compound represented by formula (IV):

(IV)

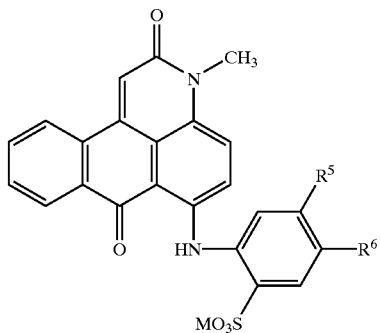

(I)

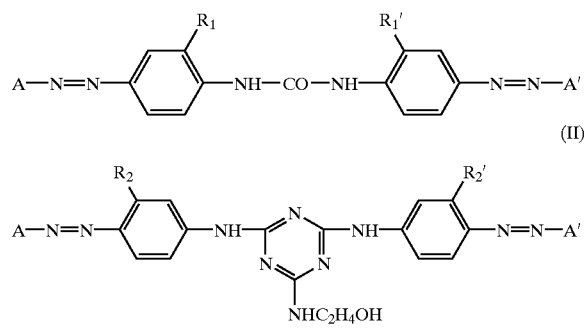

(II)

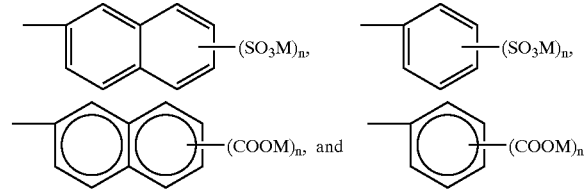

wherein
- M represents a hydrogen atom, lithium, sodium, potassium, ammonium, or an organic amine;
- $R^5$ represents a hydrogen atom, a chlorine atom or a group represented by formula

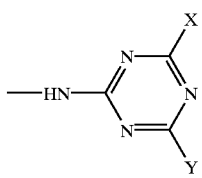

wherein
- X represents an anilino group substituted by at least one $SO_3M$ and
- Y represents OH, a chlorine atom, or a morpholino group; and
- $R^6$ represents a hydrogen atom, a chlorine atom, $SO_3M$, or a $C_1$–$C_4$ alkyl group.

According to another aspect of the present invention, there is provided a magenta ink composition comprising as a colorant the compound represented by formula (III) and the compound represented by formula (IV) in a weight ratio of 1:1 to 1:5. Further, according to the present invention, there is provided an ink set comprising this magenta ink composition.

According to a further aspect of the present invention, there is provided an ink set comprising: a yellow ink composition; two magenta ink compositions different from each other in color density, a magenta ink composition with higher color density and a magenta ink composition with lower color density; and two cyan ink compositions different from each other in color density, a cyan ink composition with higher color density and a cyan ink composition with lower color density, said ink compositions containing as colorants the following respective specific compounds.

Specifically, the ink set according to this aspect of the present invention comprises: a yellow ink composition; two magenta ink compositions different from each other in color density, a magenta ink composition with higher color density and a magenta ink composition with lower color density; and two cyan ink compositions different from each other in color density, a cyan ink composition with higher color density and a cyan ink composition with lower color density, said yellow ink composition containing as a colorant a compound represented by formula (I) and/or a compound represented by formula (II):

wherein
- $R_1$, $R_1'$, $R_2$, and $R_2'$ each independently represent $CH_3$ or $OCH_3$; and
- A and A' each independently represent a group having a structure selected from the group consisting of

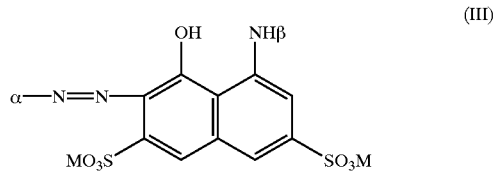

wherein
- M represents a hydrogen atom, lithium, sodium, potassium, ammonium, or an organic amine; and
- n is an integer of 1 or 2, said magenta ink composition with higher color density containing as a colorant a compound represented by formula (III):

(III)

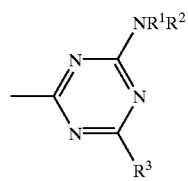

wherein
- α represents a $C_1$–$C_4$ alkyl or alkoxy group or an OH—, $SO_3H$—, or COOM-substituted phenyl or naphthyl group;
- β represents a hydrogen atom or a group represented by formula

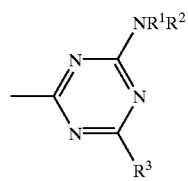

wherein
- $R^1$ represents a hydrogen atom or an OH— or COOH-substituted $C_1$–$C_4$ alkyl group,
- $R^2$ represents an OH—, $OCH_3$—, OC2H,—, $SO_3M$—, or COOM-substituted $C_1$–$C_4$ alkyl or phenyl group, and $R^3$ represents an OH, COOH, or $NHR^4$ wherein $R^4$ represents an $SO_3M-$ or COOH-substituted $C_1-C_4$ alkyl group; and M represents a hydrogen atom, lithium, sodium, potassium, ammonium, or an organic amine, and/or a compound represented by formula (IV):

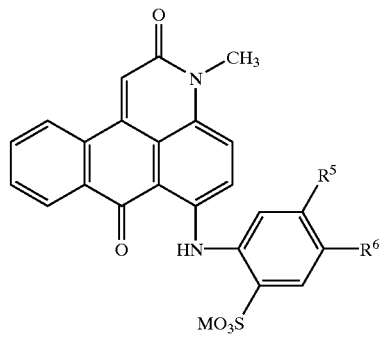

(IV)

wherein

M represents a hydrogen atom, lithium, sodium, potassium, ammonium, or an organic amine;

$R^5$ represents a hydrogen atom, a chlorine atom or a group represented by formula

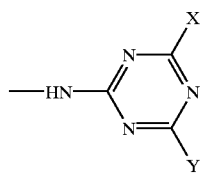

wherein

X represents an anilino group substituted by at least one $SO_3M$ and

Y represents OH, a chlorine atom, or a morpholino group; and $R^6$ represents a hydrogen atom, a chlorine atom, $SO_3M$, or a $C_1-C_4$ alkyl group, said magenta ink composition with lower color density containing as a colorant the compound represented by formula (III) and/or the compound represented by formula (IV), said cyan ink composition with higher color density and said cyan ink composition with lower color density each containing as a colorant a compound represented by formula (V):

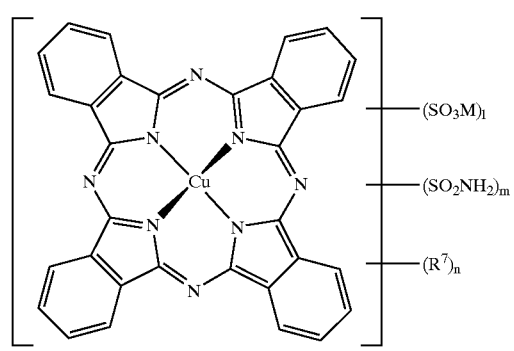

(V)

wherein $R^7$ represents OH, COOM, or $R^8$COOM wherein $R^8$ represents a $C_4-C_9$ alkyl group; and 1, m, and n are each 0 to 4 with (1+m+n)=4.

According to the ink sets of the present invention, the presence of specific compounds as the colorant in the respective ink compositions can significantly improve the color reproduction of printed images and, at the same time, can yield images having improved lightfastness. Further, according to the ink sets of the present invention, nozzle clogging of a recording head can be prevented to realize stable ink ejection.

DESCRIPTION OF THE PREFERRED EMBODIMENTS

Ink Set

Figure 1:
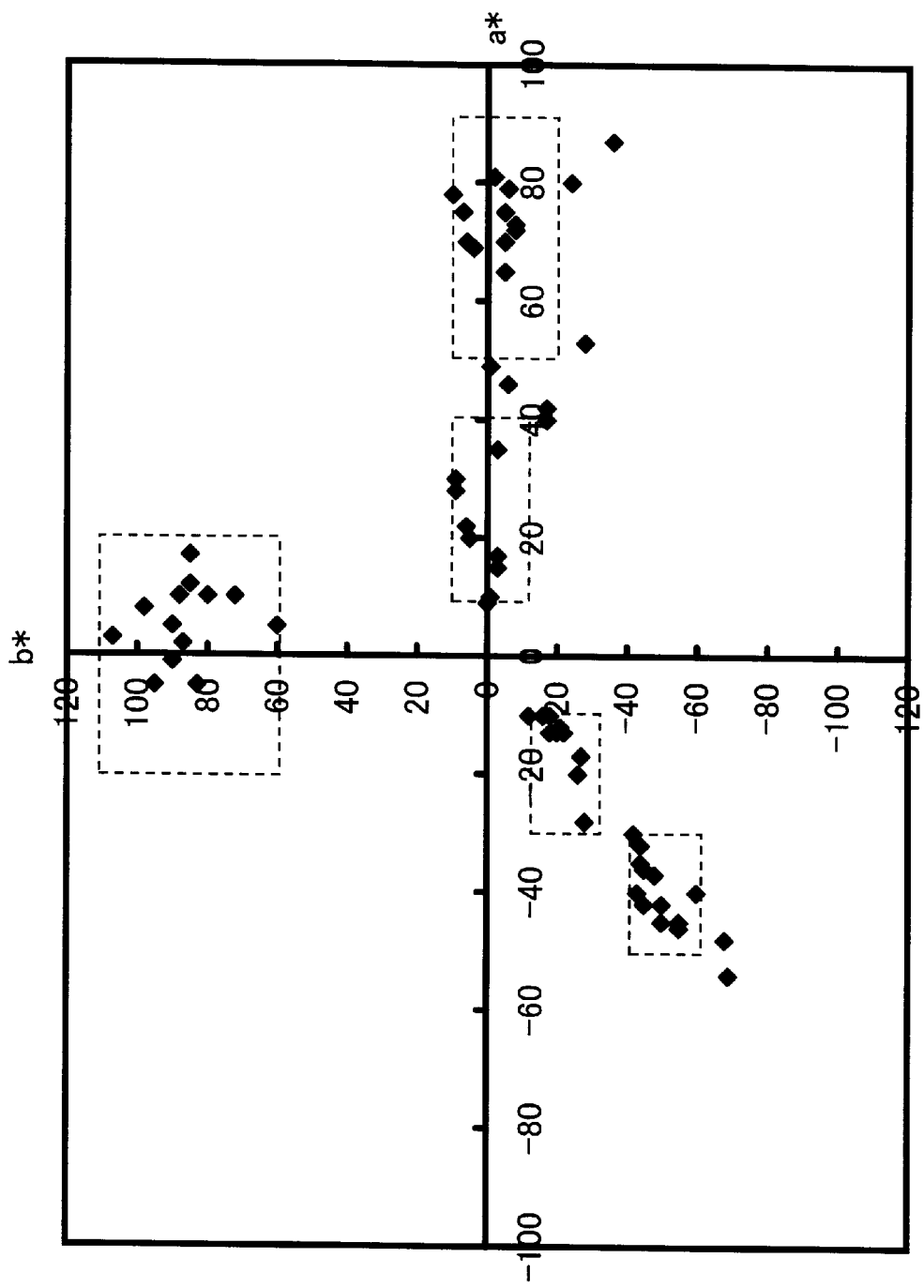
FIG. 1 is a diagram showing the results of a color reproduction test in an evaluation test E, that is, showing the distribution of hues of inks determined by calculation of color with a spectrophotometer, wherein distribution points of hue correspond to data shown in Table 23.

The ink set according to the present invention may be used in recording methods using an ink composition. Recording methods using an ink composition include, for example, an ink jet recording method, a recording method using writing utensils, such as pens, and other various recording methods. Preferably, the ink composition according to the present invention is used in the ink jet recording method.

The ink set according to one aspect of the present invention basically comprises two magenta ink compositions different from each other in color density. The ink set according to another aspect of the present invention comprises a yellow ink composition, two magenta ink compositions different from each other in color density, and two cyan ink compositions different from each other in color density. Alternatively, the ink set may comprise a yellow ink composition, a magenta ink composition with a single color density, and a cyan ink composition with a single color density. The two ink compositions different from each other in color density may be divided into an ink composition with higher color density and an ink composition with lower color density.

Yellow Ink Composition

The yellow ink composition to be used in the present invention contains as a colorant a compound represented by formula (I) and/or a compound represented by formula (II). According to the present invention, compounds represented by formula (I) and/or compounds represented by formula (II) as the colorant may be used alone or as a mixture of two or more.

Compounds represented by formula (I) and/or compounds represented by formula (II) include C.I. Direct Yellow 86 and C.I. Direct Yellow 132. Further, the following compounds may be mentioned as specific examples thereof.

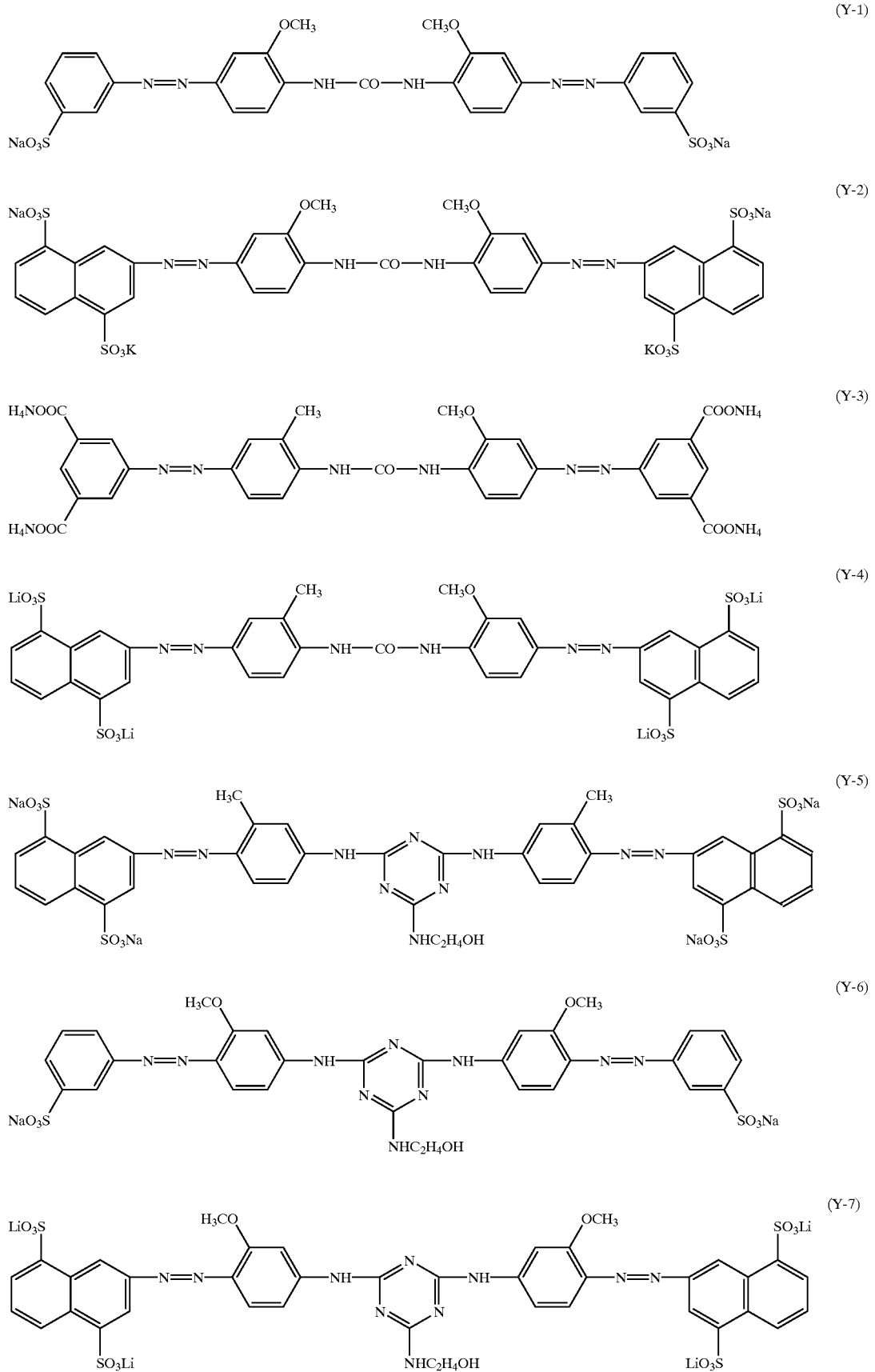

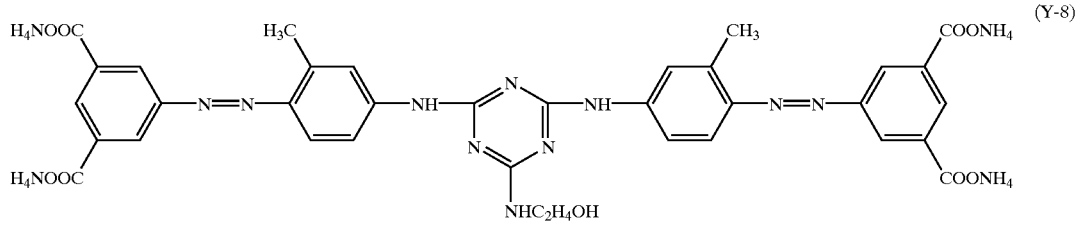

The concentration of the colorant in the yellow ink composition may be suitably selected. In general, however, the ink composition preferably contains 0.3 to 6.0% by weight in total of the compound represented by formula (I) and/or the compound represented by (II). This concentration range is preferred also from the viewpoint of the balance between the magenta ink composition and the cyan ink composition. Further, when the formation of blotted images (solid printing with 100% duty) on the so-called "plain papers" is carried out, the OD value of yellow is preferably in the range of 1.0 to 1.5. Therefore, the content of the compound represented by formula (I) and/or the compound represented by formula (II) in the yellow ink composition is preferably 0.3 to 4.0% by weight in total, still more preferably 1.5 to 4.0% by weight in total.

Magenta Ink Compositions

The two magenta ink compositions different from each other in color density to be used in the ink set according to the present invention are composed of a magenta ink composition with higher color density (hereinafter often referred to as "deep magenta ink") and a magenta ink composition with lower color density (hereinafter often referred to as "light magenta ink"). Ink jet recording using a deep magenta ink and a light magenta ink can provide recorded images having high sharpness and excellent lightfastness and gas resistance.

According to one aspect of the present invention, there is provided a magenta ink set comprising: a magenta ink composition with higher color density containing as a colorant the compound represented by formula (III) as defined above; and a magenta ink composition with lower color density containing as a colorant the compound represent by formula (IV) as defined above.

According to another aspect of the present invention, there is provided a magenta ink composition comprising the compound represented by formula (III) and the compound represented by formula (IV) as a colorant in a weight ratio of 1:1 to 1:5. At that time, the content of the colorant is preferably 0.5 to 5% by weight based on the total amount of the ink composition. According to a further aspect of the present invention, there is provided a magenta ink set comprising this magenta ink composition.

Ink compositions used in combination with the magenta ink set according to the present invention are not particularly limited. Specifically, the magenta ink set may be used in combination with desired yellow ink compositions, cyan ink compositions, and, if necessary, black ink compositions. The magenta ink compositions constituting the magenta ink set may be identical to the above magenta ink compositions in chemical composition and the like except for use in combination with the above ink compositions. The magenta ink set according to the present invention can realize highly lightfast and sharp images.

The magenta ink composition with higher color density to be used in the present invention contains as a colorant the compound represented by formula (III) and/or the compound represented by formula (IV). The ink composition containing this compound as such, that is, when used in the formation of a single-color image, can yield images having excellent sharpness and lightfastness.

Specific examples of compounds represented by formula (III) include the following compounds.

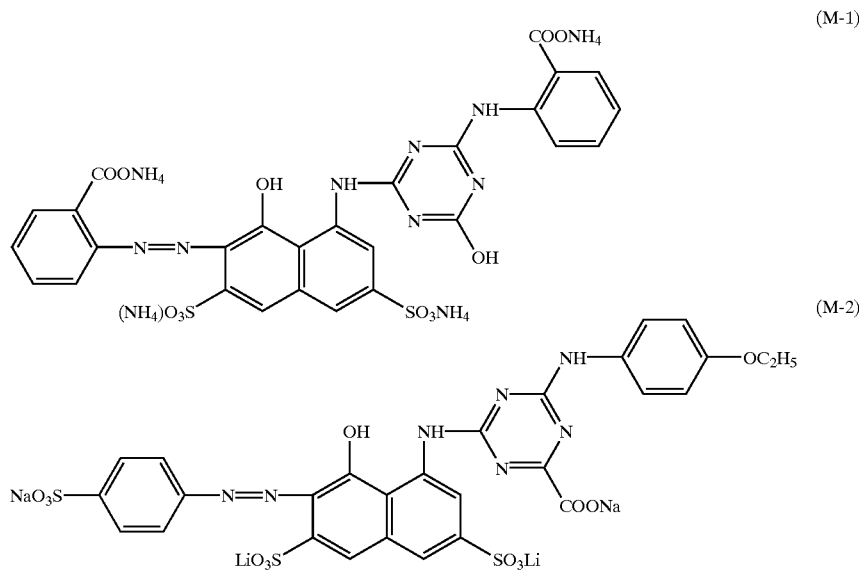

-continued
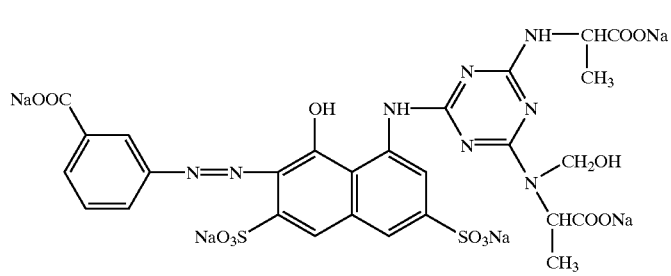
(M-3)
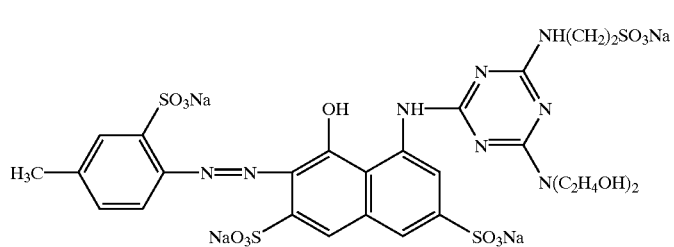
(M-4)
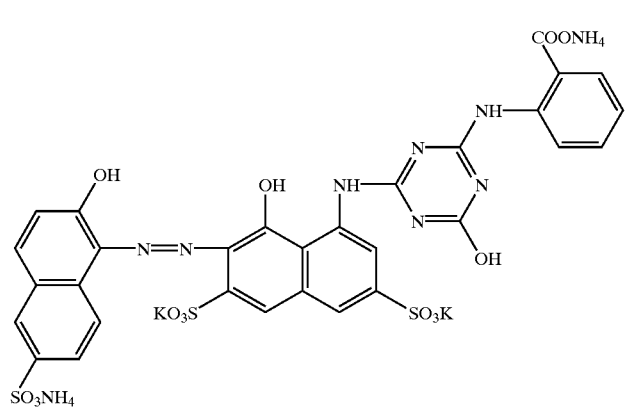
(M-5)
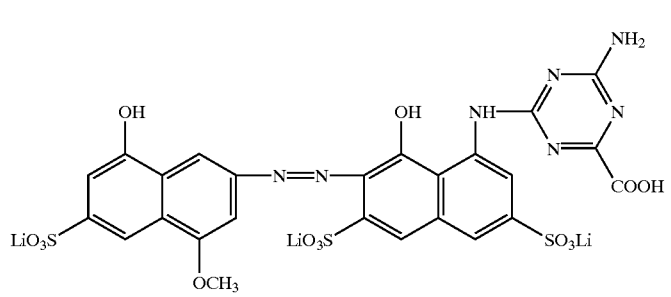
(M-6)
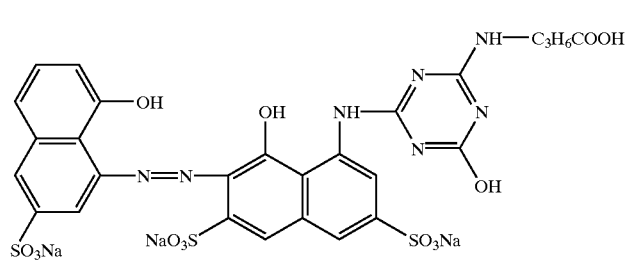
(M-7)

(M-8)
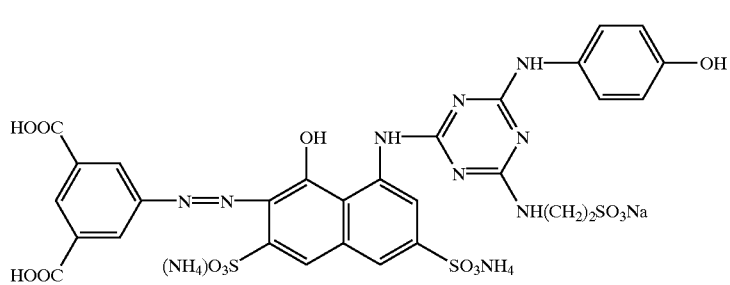
(M-9)
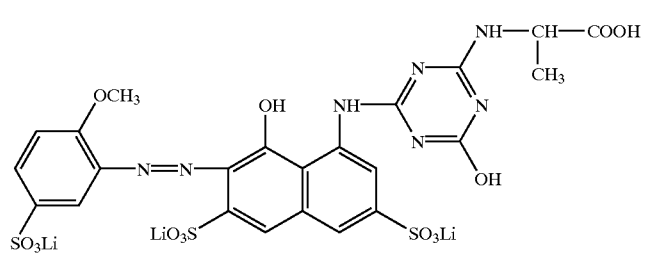
(M-10)
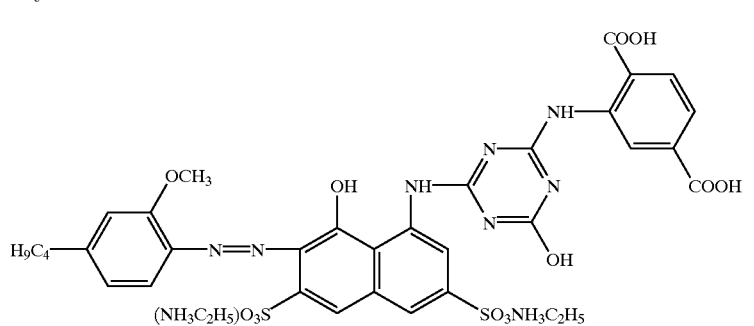
Specific examples of compounds represented by formula (IV) include the following compounds.
(LM-1)
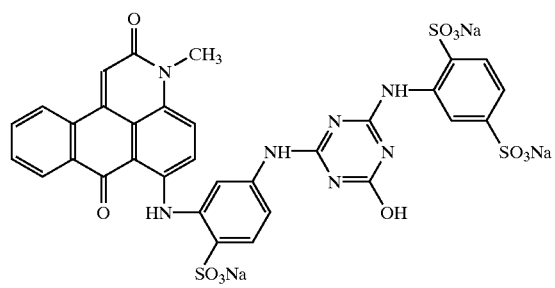
(LM-2)
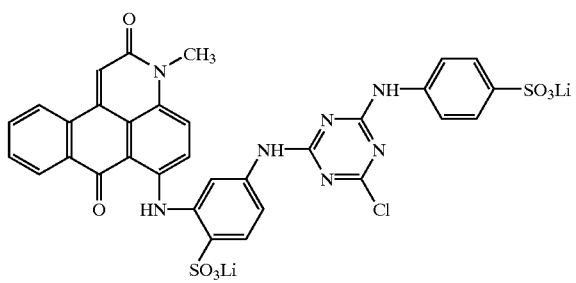
(LM-3)
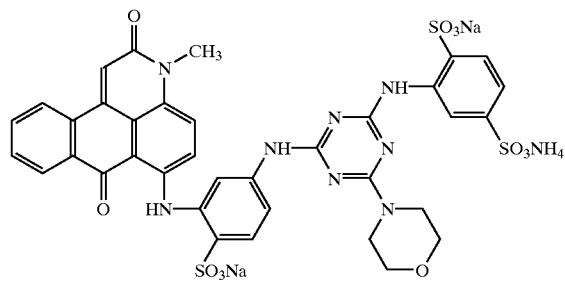
(LM-4)
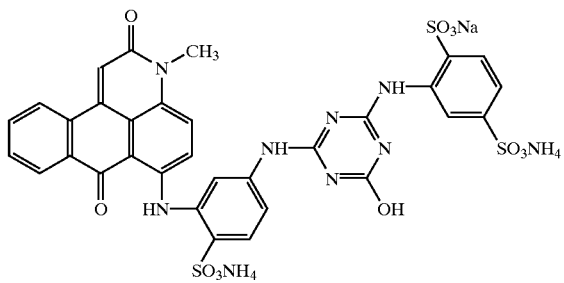

-continued
(LM-5)
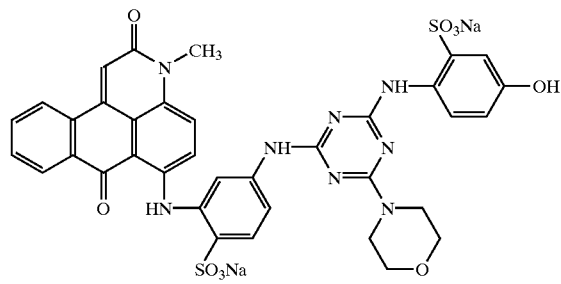
(LM-6)
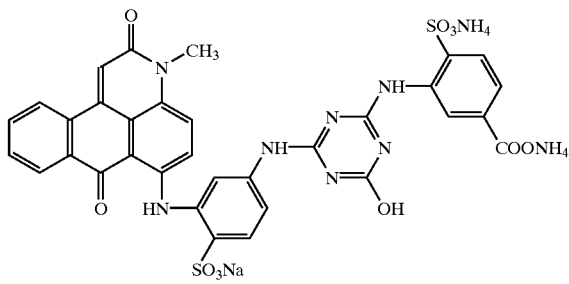
(LM-7)
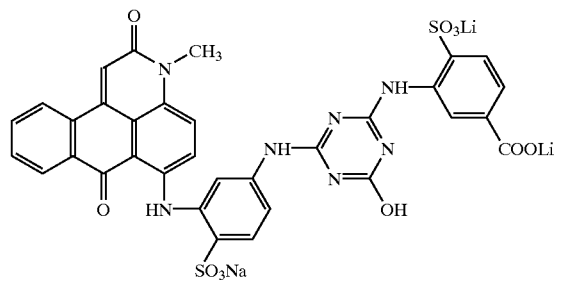
(LM-8)
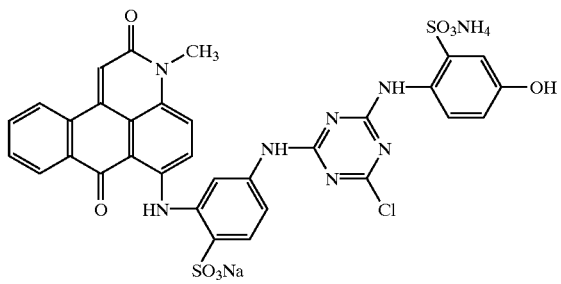
(LM-9)
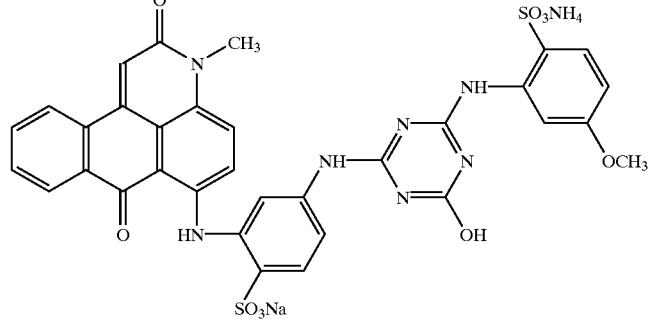
(LM-10)
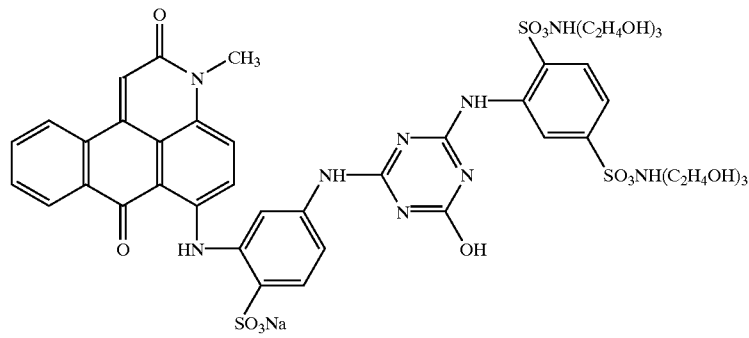
(LM-11)
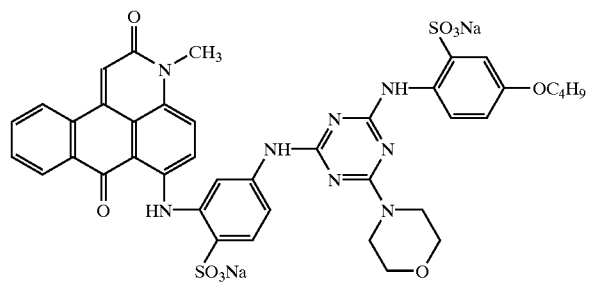
(LM-12)
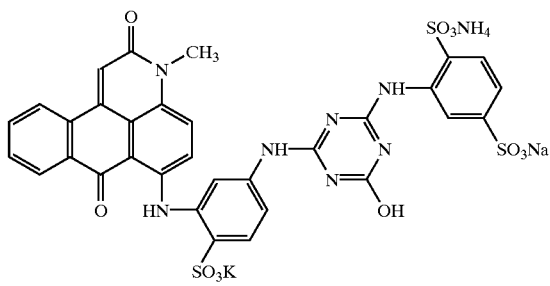

-continued

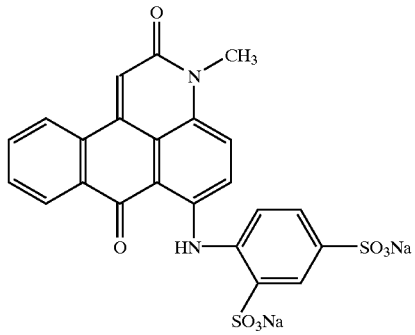
(LM-13)

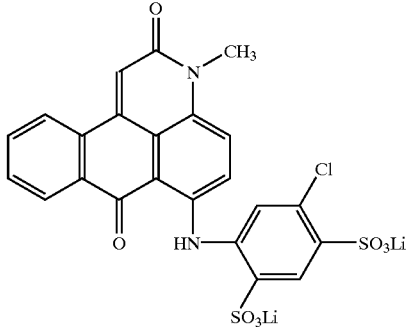
(LM-14)

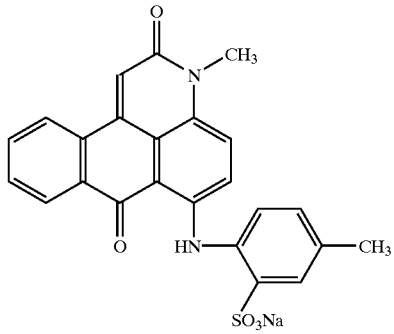
(LM-15)

According to the present invention, compounds represented by formula (III) and/or compounds represented by formula (IV) may be used alone or as a mixture of two or more, as the colorant used in the magenta ink composition with higher color density.

According to one preferred embodiment of the present invention, the compound represented by formula (III) is preferred as the colorant used in the magenta ink composition with higher color density.

The concentration of the colorant in the magenta ink composition with higher color density may be properly selected. In general, however, the ink composition preferably contains the compound represented by formula (III) in an amount of 1.0 to 5.0% by weight. Further, when the formation of blotted images (solid printing with 100% duty) on the so-called "plain papers" is carried out, the OD value of magenta is preferably in the range of 1.0 to 1.5. Therefore, the content of the compound represented by formula (III) in the magenta ink composition with higher color density is more preferably 1.0 to 4.0% by weight, still more preferably 1.5 to 3.5% by weight.

The magenta ink composition with lower color density used in the present invention contains as the colorant the compound represented by formula (III) and/or the compound represented by formula (IV).

The compound represented by formula (III) and the compound represented by formula (IV) may be selected from the compounds as used in the magenta ink composition with higher color density.

According to the present invention, compounds represented by formula (III) and/or compounds represented by formula (IV) may be used alone or as a mixture of two or more, as the colorant used in the magenta ink composition with lower color density.

According to one preferred embodiment of the present invention, the compound represented by formula (IV) is preferred as the colorant used in the magenta ink composition with lower color density.

The concentration of the colorant in the magenta ink composition with lower color density may be properly selected according to the color balance between the magenta ink composition with lower color density and the magenta ink composition with higher color density used in combination with the magenta ink composition with lower color density. In general, however, when the compound represented by formula (IV) is used in the magenta ink composition with lower color density, the content of the compound represented by formula (IV) in the magenta ink composition with lower color density is preferably 0.5 to 3.0% by weight, more preferably 1 to 3% by weight. When the compound falls within the above concentration range, the magenta ink composition with lower color density, when used in combination with the magenta ink composition with higher color density, can offer a good color balance.

When a mixture of the compound represented by formula (III) with the compound represented by formula (IV) is used as the colorant, the weight ratio of the compound represented by formula (III) and the compound represented by formula (IV) is preferably in a weight ratio of 1:1 to 1:5.

Cyan Ink Composition

The two cyan ink compositions different from each other in color density to be used in the ink set according to the present invention are composed of a cyan ink composition with higher color density (hereinafter often referred to as "deep cyan ink") and a cyan ink composition with lower color density (hereinafter often referred to as "light cyan ink").

The cyan ink composition with higher color density and the cyan ink composition with lower color density to be used in the present invention each contain as the colorant the compound represented by formula (V).

The difference in color density between the ink compositions different from each other in color density may be provided by using two ink compositions having different dye concentrations, or by properly selecting the types of colorants used.

Specific examples of compounds represented by formula (V) include those represented by the following formulae, C.I. Direct Blue 86, 87, and 199, and Projet Fast Cyan 2 (products of Zeneca).

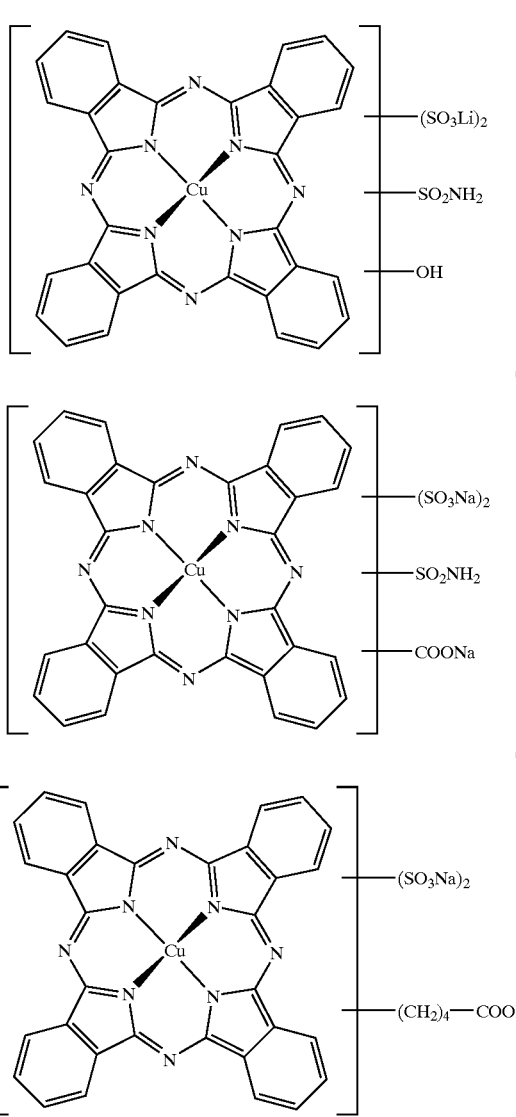

Regarding the colorant to be used in the cyan ink composition with higher color density and the colorant to be used in the cyan ink composition with lower color density according to the present invention, compounds represented by formula (V) may be used alone or as a mixture of two or more.

The concentration of the colorant in the cyan ink composition with higher color density may be properly selected. In general, however, the cyan ink composition with higher color density preferably contains 2.0 to 6.0% by weight of the compound represented by formula (V). Further, when the formation of blotted images (solid printing with 100% duty) on the so-called "plain papers" is carried out, the OD value of cyan is preferably in the range of 1.0 to 1.5. Therefore, the content of the compound represented by formula (V) in the cyan ink composition with higher color density is more preferably 2.5 to 4.5% by weight.

The concentration of the colorant in the cyan ink composition with lower color density may be properly selected according to the color balance between the compound represented by formula (V) used as the colorant and the deep cyan ink used in combination with the light cyan ink. In general, preferably, the cyan ink composition with lower color density contains 0.4 to 1.5% by weight of the compound represented by formula (V).

When the cyan ink composition with lower color density contains the colorant in the above concentration range, the cyan ink composition with lower color density, when used in combination with the cyan ink composition with higher color density, can offer a good color balance.

According to one preferred embodiment of the present invention, in the ink set, the yellow ink composition contains 0.3 to 4.0% by weight in total of the compound represented by formula (I) and/or the compound represented by formula (II), the magenta ink composition with higher color density contains 1.0 to 4.0% by weight of the compound represented by formula (III), the magenta ink composition with lower color density contains 0.5 to 3.0% by weight of the compound represented by formula (IV), and, in this case, the cyan ink composition with higher color density contains 1.0 to 4.0% by weight of the compound represented by formula (V) and the cyan ink composition with lower color density contains 0.5 to 3.0% by weight of the compound represented by formula (V).

According to a further aspect of the present invention, there is provided an ink set comprising a yellow ink composition, a magenta ink composition, and a cyan ink composition, wherein the cyan ink composition contains as a colorant the compound represented by formula (V). The compound represented by formula (V) may be selected from the compounds as described above. The concentration of the colorant in the cyan ink composition may be properly selected. In general, however, the cyan ink composition preferably contains 1.0 to 4.0% by weight of the colorant.

In the ink set according to the present invention, the hue (a*, b*) of each ink composition constituting the ink set preferably falls within a specific range. In this case, the hue of the ink composition refers to hue as determined using spectral properties of a solution prepared by diluting 1 g of the ink composition with 1,000 ml of pure water. For example, measurement may be carried out with a spectrophotometer (U-3300, manufactured by Hitachi, Ltd.) under specific conditions (standard light source: D65, field of view: 2 degrees, measurement wavelength 300 to 800 nm), followed by color calculation to determinehue (L*, a*, b*). In this case, L*represents lightness, and a* and b* each represent hue (chromaticity). More specifically, a* represents the direction of red, –a* represents the direction of green, b* represents the direction of yellow, and –b* represents the direction of blue.

According to the present invention, when the ink set comprises a yellow ink composition, two magenta ink compositions different from each other in color density, and two cyan ink compositions different from each other in color density, the hue (a*, b*) is preferably in the range of (–20 to 20, 60 to 110) for the yellow ink composition, in the range of (50 to 90, –20 to 10) for the magenta ink composition with higher color density, in the range of (10 to 40, –10 to 10) for the magenta ink composition with lower color density, in the range of (–50 to –30, –60 to –40) for the cyan ink composition with higher color density, and in the range of (–30 to –10, –30 to –10) for the cyan ink composition with lower color density.

When the ink set according to the present invention comprises a yellow ink composition, a magenta ink composition with a single color density, and a cyan ink composition with a single color density, the hue (a*, b*) is preferably in the range of (−20 to 20, 60 to 110) for the yellow ink composition, in the range of (50 to 90, −20 to 10) for the magenta ink composition, and in the range of (−50 to −30, −60 to −40) for the cyan ink composition.

When the hues (a*, b*) of the ink compositions contained in the ink set fall within the respective ranges as described above, color images having excellent color reproduction and color tone can be provided.

Black Ink Composition

According to the present invention, the ink set comprising a yellow ink composition, two magenta ink compositions different from each other in color density, and two cyan ink compositions different from each other in color density may further comprise a black ink composition.

Any dye or pigment capable of yielding a black print may be used as a colorant contained in the black ink composition usable in the present invention. Such dyes include, for example, various dyes commonly used in ink compositions, especially used in ink jet recording, such as direct dyes, acid dyes, foodstuff dyes, basic dyes, reactive dyes, disperse dyes, vat dyes, soluble vat dyes, and reactive disperse dyes. Examples of pigments usable herein include black pigments such as carbon black.

The black ink composition usable in the present invention is preferably a water-soluble black ink from the viewpoint of safety and the like.

According to the present invention, these colorants may be contained, either alone or as a mixture of two or more, in the black ink composition.

Water, Water-soluble Organic Solvent, and Other Optional Ingredients

In the ink compositions to be used in the present invention, water or a mixed solution composed of water and a water-soluble organic solvent is suitable as a main solvent. Water may be pure water obtained, for example, by ion exchange, ultrafiltration, reverse osmosis, distillation or the like, or ultrapure water. Further, water, which has been sterilized by ultraviolet irradiation or by addition of hydrogen peroxide, is suitable because, when the ink composition is stored for a long period of time, it can prevent the growth of mold or bacteria.

In the ink compositions to be used in the present invention, when water is used as the main solvent, the water content is preferably 50 to 90% by weight, more preferably 60 to 80% by weight, based on the ink composition.

According to a preferred embodiment of the present invention, the solvent in the ink compositions to be used in the present invention is a mixed solution composed of water and a water-soluble organic solvent. Preferably, the solvent further contains a wetting agent comprising a high-boiling organic solvent. Preferred examples of high-boiling organic solvents usable herein include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol mono-iso-propyl ether; urea; 2-pyrrolidone and N-methyl-2-pyrrolidone; 1,3-dimethyl-2-imidazolidinone; formamide; acetamide; dimethyl sulfoxide; sorbit; sorbitan; acetin; diacetin; triacetin; and sulfolane. They may be used alone or in combination of two or more.

The amount of the wetting agent added is preferably in the range of about 3 to 40% by weight, more preferably in the range of about 3 to 30% by weight, based on the ink composition.

The ink compositions to be used in the present invention may further contain a surfactant. Examples of surfactants include anionic surfactants, nonionic surfactants, and acetylene glycol surfactants. They may be used alone or as a mixture of two or more.

Specific examples of preferred acetylene glycol surfactants usable in the present invention include compounds represented by the following formula (a):

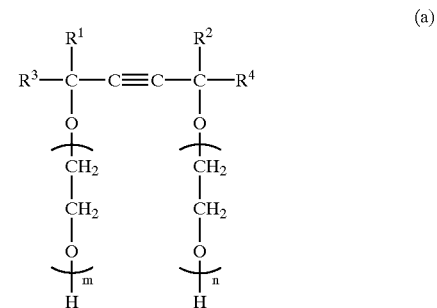

wherein $0 \leq m+n \leq 50$; and $R^1$, $R^2_1$ $R^3$, and $R^4$ each independently represent an alkyl group (preferably an alkyl group having 1 to 6 carbon atoms).

Among the compounds represented by formula (a), particularly preferred compounds include 2,4,7,9-tetramethyl-5-decyne-4,7-diol, 3,6-dimethyl-4-octyne-3,6-diol, and 3,5-dimethyl-1-hexyn-3-ol. Commercially available products may also be used as the acetylene glycol surfactant represented by the formula (a). Specific examples thereof include Surfynol 82, Surfynol 104, Surfynol 440, Surfynol 465, Surfynol 485, and Surfynol TG (all the above products being available from Air Products and Chemicals Inc.) and OLFINE STG and OLFINE E 1010 (tradenames: manufactured by Nissin Chemical Industry Co., Ltd.).

The amount of the surfactant added is preferably about 0.1 to 3% by weight, more preferably about 0.5 to 2% by weight, based on the ink composition. The surface tension of the ink compositions to be used in the present invention is generally not more than 45 mN/m, preferably 25 to 45 mN/m.

The ink compositions to be used in the present invention may further contain nozzle clogging preventives, preservatives or antimolds, antioxidants, electric conductivity adjustors, pH adjustors, solubilizers, viscosity modifiers, penetrants, surface tension modifiers, oxygen absorbers, etc.

Examples of preservatives or antimolds include sodium benzoate, pentachlorophenol sodium, 2-pyridinethiol-1-oxide sodium, sodium sorbate, sodium dehydroacetate, and 1,2-dibenzothiazolin-3-one (Proxel CRL, Proxel BDN, Proxel GXL, Proxel XL-2, and Proxel TN, manufactured by Zeneca Co., Ltd.).

Examples of pH adjustors, solubilizers, or antioxidants usable in the ink compositions include: amines, such as diethanolamine, triethanolamine, propanolamine, andmorpholine, and modification products thereof; inorganic salts, such as potassium hydroxide, sodium hydroxide, and lithium hydroxide; ammonium hydroxide; quaternary ammonium hydroxide, such as tetramethylammonium; salts of carbonic acid, such as potassium carbonate, sodium carbonate, and lithium carbonate; salts of phosphoric acid, such as potassium phosphate, sodium phosphate, and lithium phosphate; N-methyl-2-pyrrolidone; ureas, such as urea, thiourea, and tetramethylurea; allophanates, such as allophanate and methyl allophanate; biurets, such as biuret, dimethylbiuret, and tetramethylbiuret; and L-ascorbic acid and salts thereof.

According to the present invention, the other optional ingredients may be used alone, or alternatively a plurality of optional ingredients may be selected from the same category or different categories and used as a mixture.

According to the present invention, for each ink composition, the amounts of all the ingredients are preferably selected so that the ink composition has a viscosity of less than 10 mPa·s at 20° C.

Recording Method

The ink set according to the present invention may be used in a recording method comprising the step of depositing an ink composition onto a recording medium to perform printing.

According to another aspect of the present invention, there is provided an ink jet recording method comprising the steps of: ejecting droplets of an ink composition contained in the ink set according to the present invention; and depositing the droplets onto a recording medium to perform printing.

According to a further aspect of the present invention, there is provided a record produced by any one of these recording methods.

EXAMPLES

The following examples further illustrate the present invention, but should not be construed as limiting the scope of the present invention.

Evaluation Test A

Preparation of Ink Compositions

Ingredients specified in Table 1 were mixed together in a mixing ratio specified in Table 1. The resultant solutions were filtered under pressure through a membrane filter having a pore diameter of 1 µm to prepare magenta ink compositions 1a to 11a. In the following tables, the amount of each ingredient is in wt % of the ingredient based on the total weight of the ink composition. The balance consists of water. For ink compositions 6a to 11a as comparative examples, compounds represented by formulae (III) and (IV) were used as colorants, and, in addition, C.I. Acid Red 52 and C.I. Acid Red 249 were used as conventional magenta colorants for evaluation.

The concentration of the colorant in the ink composition was regulated so that the OD value of magenta as printed on Xerox 4024 paper (plain paper) (manufactured by Xerox Corp., U.S.A.) was 1.0.

TABLE 1

| | Magenta ink | | | | | | | | | | |
|---|---|---|---|---|---|---|---|---|---|---|---|
| | 1a | 2a | 3a | 4a | 5a | 6a (comp. ex.) | 7a (comp. ex.) | 8a (comp. ex.) | 9a (comp. ex.) | 10a (comp. ex.) | 11a (comp. ex.) |
| Dye | | | | | | | | | | | |
| M-1 | 1 | | | 1 | | | | 2.5 | | 1 | |
| M-4 | | 1.5 | | | 1.2 | | | | | | 1 |
| M-10 | | | 1 | | | | | | | | |
| LM-4 | 1 | | | | 2.8 | | | | | 0.8 | |
| LM-11 | | 2.0 | | 3 | | | | | | | 5.2 |
| LM-13 | | | 3.8 | | | | | | 4.5 | | |
| C.I. Acid Red 52 | | | | | | 3 | | | | | |
| C.I. Acid Red 249 | | | | | | | 4 | | | | |
| Triethylene glycol monobutyl ether | 10 | 10 | | | 10 | | | | | 10 | 10 |
| Diethylene glycol monobutyl ether | | | 10 | | | | 10 | | 10 | | |
| Polyethylene glycol monobutyl ether | | | | 10 | | | | | | | |
| Diethylene glycol | 10 | 10 | 10 | 10 | 10 | 10 | 10 | 10 | 10 | 10 | 10 |
| Glycerin | 10 | 10 | 10 | 10 | 10 | 10 | 10 | 10 | 10 | 10 | 10 |
| Olfine E 1010 | | 1 | | 2 | | | 1 | | | | 1 |
| Olfine STG | | | 1 | | 0.5 | | | 1 | 1 | | |
| Triethanolamine | 1 | 0.5 | 1 | | 1 | 1 | 0.5 | 1 | 1 | 1 | 0.5 |
| 2-Pyrrolidone | 2.5 | 2.5 | 2.5 | 2.5 | 2.5 | 2.5 | 2.5 | 2.5 | 2.5 | 2.5 | 2.5 |
| KOH | 0.1 | 0.1 | | | 0.1 | 0.1 | 0.1 | | | 0.1 | 0.1 |
| EDTA | 0.01 | 0.01 | 0.01 | 0.01 | 0.01 | 0.01 | 0.01 | 0.01 | 0.01 | 0.01 | 0.01 |
| Proxel XL-2 | 0.3 | 0.3 | 0.3 | 0.3 | 0.3 | 0.3 | 0.3 | 0.3 | 0.3 | 0.3 | 0.3 |

Abbreviations used in Table 1 are as follows.

KOH represents potassium hydroxide.

EDTA represents dihydrogen disodium ethylenediaminetetraacetate (chelating agent).

Olfine E 1010 and Olfine STG are tradenames for acetylene glycol surfactants manufactured by Nissin Chemical Industry Co., Ltd.

Proxel XL-2 is a tradename for a preservative manufactured by Zeneca K.K.

Tests on Evaluation of Ink Compositions

The ink compositions thus obtained were evaluated by the following tests 1A to 4A using the following recording media (1) to (4). The recording medium (1) is the so-called "plain paper," and the recording media (2) to (4) are specialty recording media for ink jet printers.

(Recording Media)
(1) Xerox 4024 (Xerox Corp., U.S.A.)
(2) EPSON Superfine Paper (Epson Hanbai Corporation)
(3) EPSON Specialty Gloss Paper for photographs (Epson Hanbai corporation)
(4) EPSON Specialty Gloss Film (Epson Hanbai Corporation)

In the evaluation tests, an ink jet printer EM-900C (manufactured by Seiko Epson Corporation) was used.

The lightfastness was evaluated by a lightfastness test using a xenon fadeometer Ci35A (manufactured by Atlas Electric Device) as an acceleration tester for fastness to light.

Test 1A: Lightfastness of Magenta Ink Compositions

For themagenta ink compositions, the formation of blotted images (solid printing) was carried out on the recording media (1) to (4). Light was applied to the print samples by means of a xenon fadeometer Ci35A (manufactured by Atlas Electric Device) for 60 hr. In this case, hue (L*, a*, b*) was determined before and after light irradiation by means of a GRETAG densitometer (manufactured by GRETAG, Ltd.), followed by the determination of the difference between color before the test and color after the test, ΔE*ab, by equation (i). The lightfastness was evaluated from the results according to the following criteria.

$$\Delta E^* ab = [(\Delta L^*)^2 + (\Delta a^*)^2 + (\Delta b^*)^2]^{1/2} \quad (i)$$

A: Color difference ΔE*ab of not more than 5
B: Color difference ΔE*ab of more than 5 to 10
C: Color difference ΔE*ab of more than 10 to 20
D: Color difference ΔE*ab of more than 20

Test 2A: Waterfastness of Magenta Ink Compositions

For the magenta ink compositions 1a to 11a, the formation of blotted images (solid printing) was carried out on the recording media (1) to (4), followed by drying to provide prints. Pure water was put dropwise onto the prints. One min after dropping of the pure water, the prints were inspected for marks of water droplets. The waterfastness of the ink compositions was evaluated from the results according to the following criteria.

A: Marks of water droplets were not left at all.
B: Marks of water droplets were not substantially left.
C: Marks of water droplets were somewhat left.
D: Marks of water droplets were considerably left.

Test 3A: Fastness of Magenta Ink Compositions to Moisture

For the magenta ink compositions 1a to 11a, outline (void) characters were printed on the recording media (1) to (4). The prints were dried, and allowed to stand for one day under an environment of 40° C. and 85% RH. After the standing, the prints were inspected for blurring of ink characters. The fastness of the ink compositions to moisture was evaluated from the results according to the following criteria.

A: Void portions were not blurred at all.
B: The characters were still legible, although void portions were somewhat blurred.
C: Void portions were considerably blurred, rendering the characters considerably illegible.

Test 4A: Storage Stability of Ink Compositions

The ink compositions were placed in glass sample bottles. The sample bottles were hermetically sealed, and allowed to stand at 70° C. for seven days. After the standing, each ink composition was dropped on a 1-μm filter, and the filter was inspected for the presence of sediment. In this case, properties of the ink compositions were also evaluated. The storage stability of the ink compositions was evaluated from the results according to the following criteria.

A: There was neither sediment nor a change in properties and color tone of ink.
B: Properties and color tone of ink somewhat changed, although there was no sediment.
C: There were sediment and a change in properties and color tone of ink.

The results of evaluation in the tests 1A to 4A were as summarized in Table 2.

TABLE 2

| | | Magenta ink | | | | | | | | | | |
|---|---|---|---|---|---|---|---|---|---|---|---|---|
| | | 1a | 2a | 3a | 4a | 5a | 6a | 7a | 8a | 9a | 10a | 11a |
| Test 1A | Xerox 4024 | A | A | A | A | A | C | C | B | A | B | A |
| | Superfine | A | A | A | A | A | C | C | B | A | B | A |
| | Specialty Gloss Paper | A | A | A | A | C | C | B | A | A | A | A |
| | Specialty Gloss Film | A | A | A | A | A | C | C | B | A | A | A |
| Test 2A | Xerox 4024 | B | B | C | B | B | C | B | C | B | C | B |
| | Superfine | B | A | A | A | A | B | B | B | B | B | B |
| | Specialty Gloss Paper | A | A | A | A | A | B | B | B | B | B | B |
| | Specialty Gloss Film | A | A | A | A | A | B | B | B | B | B | B |
| Test 3A | Superfine | A | A | A | A | A | B | B | B | B | B | B |
| | Specialty Gloss Paper | A | A | A | A | A | C | C | B | B | B | B |
| | Specialty Gloss Film | B | A | A | B | B | C | C | B | B | B | B |
| Test 4A | | A | A | A | A | A | B | B | A | B | A | B |

Evaluation Test B

Preparation of Ink Compositions

Deep magenta ink compositions 1M to 9M and light magenta ink compositions 1LM to 8LM were prepared according to formulations specified in the following tables.

In the following tables, the amount of each ingredient is in wt % of the ingredient based on the total weight of the ink composition. The balance consists of ion-exchanged water. Dyes M-1 to M-10 and LM-1 to LM-15 are dyes having respective structures noted above.

TABLE 3

| | Deep magenta ink | | | | | | | | |
|---|---|---|---|---|---|---|---|---|---|
| | 1M | 2M | 3M | 4M | 5M | 6M (comp. ex.) | 7M (comp. ex.) | 8M (comp. ex.) | 9M (comp. ex.) |
| Dye | (M-1) 2.0 | (M-4) 2.7 | (M-7) 3.5 | (M-10) 1.0 | (M-4) 2.5 (M-10) 2.5 | (C.I. Acid Red 52) 2.0 | (C.I. Direct Red 227) 4.0 | (C.I. Reactive Red 180) 2.7 | (C.I. Acid Red 32) 2.2 |
| Glycerin | 10 | 10 | 5 | 10 | 10 | 10 | 10 | 10 | 10 |
| Diethylene glycol | | 11 | 5 | 5 | 5 | 13 | 13 | 13 | 13 |
| Triethylene glycol | 10 | | 8 | | | | | | |
| Triethanolamine | 1 | 1 | | | | | | | |
| 2-Pyrrolidone | | | 2 | | | | | | |
| 1,3-Dimethyl-2-imidazolidinone | | | 5 | | 8 | | | | |
| Urea | | | | 5 | | | | | |
| Diethylene glycol monobutyl ether | 10 | | | | | | | | |
| Triethylene glycol monobutyl ether | | 10 | | 10 | | 10 | 10 | 10 | 10 |
| Dipropylene glycol monobutyl ether | | | 10 | | | | | | |
| Olfine STG | 0.5 | | | | 3 | | | | |
| Olfine E 1010 | | 1 | | | | 1 | 1 | 1 | 1 |
| Olfine E 104 | | | | 0.5 | | | | | |
| EDTA* | 0.02 | 0.02 | 0.02 | 0.02 | 0.02 | 0.02 | 0.02 | 0.02 | 0.02 |
| Proxel XL-2** | 0.3 | 0.3 | 0.3 | 0.3 | 0.3 | 0.3 | 0.3 | 0.3 | 0.3 |
| Benzotriazole*** | 0.01 | 0.01 | 0.01 | 0.01 | 0.01 | 0.01 | 0.01 | 0.01 | 0.01 |
| Potassium hydroxide | 0.1 | 0.1 | | | 0.05 | | | | |

Note)
EDTA*: Sodium ethylenediamine tetraacetate (metal masking agent)
Proxel XL-2**: Preservative (a product of Zeneca K.K.)
Benzotriazole***: Rust preventive

TABLE 4

| | Light magenta ink | | | | | | | |
|---|---|---|---|---|---|---|---|---|
| | 1LM | 2LM | 3LM | 4LM | 5LM | 6LM (comp. ex.) | 7LM (comp. ex.) | 8LM (comp. ex.) |
| Dye | (LM-1) 1.5 | (LM-4) 2.0 | (LM-6) 3.0 | (LM-9) 0.5 | (LM-2) 2.0 (LM-10) 2.0 | (C.I. Acid Red 52) 0.5 | (M-1) 0.7 | (C.I. Acid Red 32) 0.6 |
| Glycerin | 10 | 10 | 5 | 10 | 10 | 10 | 10 | 10 |
| Diethylene glycol | | 13 | 5 | 5 | 5 | 15 | 15 | 15 |
| Triethylene glycol | 10 | | 10 | | | | | |
| Triethanolamine | | 1 | | | | | 0.5 | 0.5 |
| 2-Pyrrolidone | 2 | | | | | | | |
| 1,3-Dimethyl-2-imidazolidinone | | | 5 | | 8 | | | |
| Urea | | | | 5 | | | | |
| Diethylene glycol monobutyl ether | 10 | | | | | | | |
| Triethylene glycol monobutyl ether | | 10 | | 10 | | 10 | 10 | 10 |
| Dipropylene glycol monobutyl ether | | | 10 | | | | | |
| Olfine STG | 0.5 | | | | 3 | | | |
| Olfine E 1010 | | 1 | | | | 1 | 1 | 1 |
| Olfine E 104 | | | | 0.5 | | | | |
| EDTA* | 0.02 | 0.02 | 0.02 | 0.02 | 0.02 | 0.02 | 0.02 | 0.02 |
| Proxel XL-2** | 0.3 | 0.3 | 0.3 | 0.3 | 0.3 | 0.3 | 0.3 | 0.3 |
| Benzotriazole*** | 0.01 | 0.01 | 0.01 | 0.01 | 0.01 | 0.01 | 0.01 | 0.01 |
| Potassium hydroxide | | 0.1 | | | 0.05 | | 0.05 | 0.05 |

Note)
EDTA*: Sodium ethylenediamine tetraacetate (metal masking agent)
Proxel XL-2**: Preservative (a product of Zeneca K.K.)
Benzotriazole***: Rust preventive

Tests on Evaluation of Ink Compositions

The ink compositions thus obtained were evaluated by the following tests 1B to 5B using the following recording media (1) to (4). The recording medium (1) is the so-called "plain paper," and the recording media (2) to (4) are specialty recording media for ink jet printers.

(Recording Media)

(1) Xerox 4024 (Xerox Corp., U.S.A.)

(2) EPSON Superfine Paper (Epson Hanbai Corporation)

(3) EPSON Specialty Gloss Paper for photographs (Epson Hanbai Corporation)

(4) EPSON Specialty Gloss Film (Epson Hanbai Corporation) In the evaluation tests, an ink jet printer PM-770C (manufactured by Seiko Epson Corporation) was used.

The lightfastness was evaluated by a lightfastness test using a xenon fadeometer Ci35W (manufactured by Atlas Electric Device) as an acceleration tester for fastness to light.

Test 1B: Lightfastness of Magenta Ink Compositions

For the deep and light magenta ink compositions, the formation of blotted images (solid printing) of single colors was carried out on the recording media (1) to (4).

These print samples were subjected to a 60-hr lightfastness test using a xenon fadeometer Ci35W (manufactured by Atlas Electric Device). The difference between the color before the test and the color after the test, ΔE*ab, was determined by equation (i), and evaluated according to the following criteria.

$$\Delta E^*ab = [(\Delta L^*)^2 + (\Delta a^*)^2 + (\Delta b^*)^2]^{1/2} \quad (i)$$

A: Color difference ΔE*ab of not more than 5

B: Color difference ΔE*ab of more than 5 to 10

C: Color difference ΔE*ab of more than 10 to 20

D: Color difference ΔE*ab of more than 20

Test 2B: Test on Gas Resistance of Magenta Ink Compositions

The same print samples as used in the test 1B were evaluated for the resistance of the prints to ozone gas, sulfur dioxide gas ($SO_2$), and nitrogen dioxide gas ($NO_2$) by means of a constant rate flow type gas corrosion tester (manufactured by Yamazaki Seiki K.K.).

In the test on gas resistance, for each gas, an environment having a gas concentration of 1 ppm was provided, and each print sample was allowed to stand for 72 hr under each environment. The difference between the color before the test and the color after the test, ΔE*ab, was determined by equation (i), and evaluated according to the following criteria.

A: Color difference ΔE*ab of not more than 5 for all the test

B: Color difference ΔE*ab of more than 5 to 10 for at least one test

C: Color difference ΔE*ab of more than 10 for at least one test

The results of evaluation in the tests 1B and 2B were as summarized in Table 5.

TABLE 5

| | | Test 1B: Lightfastness Recording medium | | | | Test 2B: Gas resistance Recording medium | | | |
|---|---|---|---|---|---|---|---|---|---|
| | | (1) | (2) | (3) | (4) | (1) | (2) | (3) | (4) |
| Deep magenta ink | 1M | B | A | A | A | A | A | A | A |
| | 2M | B | A | A | A | A | A | A | A |
| | 3M | B | A | A | A | A | A | A | A |
| | 4M | B | C | B | A | A | A | A | A |
| | 5M | A | A | A | A | A | A | A | A |
| | 6M | D | D | D | D | A | D | B | D |
| | 7M | C | D | C | B | A | B | B | B |
| | 8M | C | C | B | B | A | B | A | A |
| | 9M | A | A | A | A | A | D | D | D |
| Light magenta ink | 1LM | B | B | B | A | A | A | A | A |
| | 2LM | A | A | A | A | A | A | A | A |
| | 3LM | A | A | A | A | A | A | A | A |
| | 4LM | B | B | C | B | A | A | A | A |
| | 5LM | A | A | A | A | A | A | A | A |
| | 6LM | D | D | D | D | A | D | B | B |
| | 7LM | B | B | B | A | A | A | A | A |
| | 8LM | A | A | A | A | A | D | D | D |

Test 3B: Lightfastness

Deep magenta ink compositions and light magenta ink compositions were loaded in combination as specified in Table 6 respectively into a deep magenta ink chamber and a light magenta ink chamber in an ink cartridge for PM-770C (Model IC5CL02, manufactured by Seiko Epson Corporation) to prepare ink sets 1b to 11b. Blotted images of red, blue, and composite black with a density of 70% were printed using the ink sets 1b to 11b on the recording media (1) to (4).

In this case, printing was carried out under conditions controlled such that the red with a density of 70% was constituted by the deep magenta ink, the light magenta ink, and the yellow ink, the blue with a density of 70% was constituted by the deep magenta ink, the light magenta ink, the deep cyan ink, and the light cyan ink, and the composite black with a density of 70% was constituted by the deep magenta ink, the light magenta ink, the deep cyan ink, the light cyan ink, the yellow ink, and the black ink.

The yellow ink, the deep cyan ink, the light cyan ink, and the black ink used were original inks in an ink cartridge for

TABLE 6

| | | Deep magenta ink | Light magenta ink |
|---|---|---|---|
| Ink Set | 1b | 1M | 1LM |
| | 2b | 2M | 2LM |
| | 3b | 3M | 3LM |
| | 4b | 4M | 4LM |
| | 5b | 5M | 5LM |
| | 6b (comp. ex.) | 6M | 6LM |
| | 7b (comp. ex.) | 7M | 1LM |
| | 8b (comp. ex.) | 8M | 1LM |
| | 9b (comp. ex.) | 8M | 8LM |
| | 10b (comp. ex.) | 9M | 9LM |
| | 11b (comp. ex.) | 1M | 8LM |

These print samples were subjected to a 60-hr lightfastness test using a xenon fadeometer Ci35W (manufactured by Atlas Electric Device). The difference between the color before the test and the color after the test, ΔE*ab, was determined by equation (i) in the same manner as in test 1A, and evaluated according to the same criteria as used in the test 1B.

Test 4B: Gas Resistance

The same print samples as used in the test 3B were evaluated for the resistance of the prints to ozone gas, sulfur dioxide gas ($SO_2$), and nitrogen dioxide gas ($No_2$) by means of a constant rate flow type gas corrosion tester (manufactured by Yamazaki Seiki K.K.).

In the test on gas resistance, for each gas, an environment having a gas concentration of 1 ppm was provided, and each print sample was allowed to stand for 72 hr under each environment. The difference between the color before the test and the color after the test, $\Delta E^*ab$, was determined by equation (i), and evaluated according to the following criteria.

- A: Color difference $\Delta E^*ab$ of not more than 5 for all the tests
- B: Color difference $\Delta E^*ab$ of more than 5 to 10 for at least one test
- C: Color difference $\Delta E^*ab$ of more than 10 for at least one test Test 5B: Bleeding For the ink sets shown in Table 6, blotted images of each color were formed on the recording media (1) to (4). These print samples were inspected for color bleeding or uneven color mixing in boundaries of different colors. The bleeding was evaluated from the results according to the following criteria.

- A: There was no bleeding.
- B: There was color bleeding or uneven color mixing, in slight portion, on a level causing no practical problem.
- C: There was significant color bleeding or uneven color mixing on a level causing slight practical problem.
- D: There was severe color bleeding.

The evaluation results of the tests 3B to 5B were as summarized in Table 7.

TABLE 7

| | | Test 3B: Lightfastness | | | | | Test 4B: Gas resistance | | | | | Test 5B: Bleeding | | | |
|---|---|---|---|---|---|---|---|---|---|---|---|---|---|---|---|
| | | Print with density | Recording medium | | | | Print with density | Recording medium | | | | Recording medium | | | |
| | | 70% | (1) | (2) | (3) | (4) | 70% | (1) | (2) | (3) | (4) | (1) | (2) | (3) | (4) |
| Ink set 1b | Red | B | A | A | A | A | Red | A | A | A | A | A | A | A | A |
| | Blue | B | A | A | A | A | Blue | A | A | A | A | | | | |
| | Black | B | A | A | A | A | Black | A | A | A | A | | | | |
| Ink set 2b | Red | B | A | A | A | A | Red | A | A | A | A | A | A | A | A |
| | Blue | B | A | A | A | A | Blue | A | A | A | A | | | | |
| | Black | B | A | A | A | A | Black | A | A | A | A | | | | |
| Ink set 3b | Red | B | A | A | A | A | Red | A | A | A | A | B | A | A | B |
| | Blue | B | A | A | A | A | Blue | A | A | A | A | | | | |
| | Black | B | A | A | A | A | Black | A | A | A | A | | | | |
| Ink set 4b | Red | B | C | B | A | A | Red | A | A | A | A | A | A | A | A |
| | Blue | B | B | A | A | A | Blue | A | A | A | A | | | | |
| | Black | B | C | B | A | A | Black | A | A | A | A | | | | |
| Ink set 5b | Red | A | A | A | A | A | Red | A | A | A | A | B | A | A | C |
| | Blue | A | A | A | A | A | Blue | A | A | A | A | | | | |
| | Black | A | A | A | A | A | Black | A | A | A | A | | | | |
| Ink set 6b | Red | D | D | D | D | D | Red | A | B | B | B | A | A | A | A |
| | Blue | A | B | B | B | B | Blue | A | C | C | C | | | | |
| | Black | D | D | D | D | D | Black | A | C | C | C | | | | |
| Ink set 7b | Red | C | D | D | D | B | Red | A | B | B | B | A | A | A | A |
| | Blue | C | C | C | C | C | Blue | A | C | C | C | | | | |
| | Black | B | B | B | B | B | Black | A | B | B | B | | | | |
| Ink set 8b | Red | B | D | D | D | B | Red | A | B | A | A | A | A | A | A |
| | Blue | B | C | B | A | A | Blue | A | C | B | C | | | | |
| | Black | B | C | C | A | A | Black | A | B | B | B | | | | |
| Ink set 9b | Red | B | D | D | D | B | Red | A | B | A | A | A | A | A | A |
| | Blue | C | C | C | C | D | Blue | A | C | B | C | | | | |
| | Black | C | C | C | C | D | Black | A | C | B | C | | | | |
| Ink set 10b | Red | A | A | A | A | A | Red | B | C | C | C | A | A | A | A |
| | Blue | D | D | D | D | D | Blue | B | C | C | C | | | | |
| | Black | D | D | D | D | D | Black | B | C | C | C | | | | |
| Ink set 11b | Red | B | A | A | A | A | Red | A | B | A | B | A | A | A | A |
| | Blue | B | C | C | C | D | Blue | A | B | B | B | | | | |
| | Black | B | C | C | C | D | Black | A | B | A | B | | | | |

Evaluation Test C

Preparation of Ink Sets

Ink compositions were prepared according to formulations specified in the following tables, and were then used in combination to prepare ink sets 1c to 7c. In the following tables, the amount of each ingredient is in wt % of the ingredient based on the total weight of the ink composition. The balance consists of ion-exchanged water. Colorants Y-1 to Y-8, M-1 to M-10, LM-1 to LM-15, and C-1 to C-3 are colorants having respective structures noted above.

TABLE 8

| Ink set 1c | | Yellow | Deep magenta | Light magenta | Deep cyan | Light cyan |
|---|---|---|---|---|---|---|
| Dye | Yellow | (Y-1) 0.7 (Y-4) 2.8 | | | | |
| | Deep magenta | | (M-1) 2.2 | | | |
| | Light magenta | | | (LM-1) 1.8 | | |
| | Deep cyan | | | | C.I. Direct Blue 199 3.5 | |
| | Light cyan | | | | | C.I. Direct Blue 199 1.0 |
| Glycerin | | 10 | 10 | 10 | 10 | 10 |
| Triethylene glycol | | 8 | 5 | 10 | 5 | 10 |
| Triethanolamine | | | 1 | 0.3 | | |
| Diethylene glycol monobutyl ether | | 10 | | | | |
| Triethylene glycol monobutyl ether | | | 10 | 10 | 10 | 10 |
| Olfine STG | | 1 | | | | |
| Olfine E 1010 | | | 1 | 1 | 1 | 1 |
| EDTA* | | 0.02 | 0.02 | 0.02 | 0.02 | 0.02 |
| Proxel XL-2** | | 0.3 | 0.3 | 0.3 | 0.3 | 0.3 |
| Benzotriazole*** | | 0.01 | 0.01 | 0.01 | 0.01 | 0.01 |
| Potassium hydroxide | | | 0.1 | 0.03 | | |

Note)
EDTA*: Sodium ethylenediamine tetraacetate (metal masking agent)
Proxel XL-2**: Preservative (a product of Zeneca K.K.)
Benzotriazole***: Rust preventive

TABLE 9

| Ink set 2c | | Yellow | Deep magenta | Light magenta | Deep cyan | Light cyan |
|---|---|---|---|---|---|---|
| Dye | Yellow | (Y-2) 1.0 (Y-4) 3.0 | | | | |
| | Deep magenta | | (M-4) 2.4 | | | |
| | Light magenta | | | (LM-1) 2.0 | | |
| | Deep cyan | | | | C.I. Direct Blue 199 3.0 | |
| | Light cyan | | | | | PFC2# 1 |
| Diethylene glycol | | 5 | 5 | 5 | 5 | 5 |
| Triethylene glycol | | 12 | 10 | 18 | 9 | 15 |
| Triethanolamine | | 1 | 1 | | | |
| 2-Pyrrolidone | | | 5 | 2 | | |
| Diethylene glycol monobutyl ether | | 10 | 10 | 10 | 10 | 10 |
| Olfine E 1010 | | | 1 | 1 | 1 | 1 |
| Olfine E 104 | | 1 | | | | |
| EDTA* | | 0.02 | 0.02 | 0.02 | 0.02 | 0.02 |
| Proxel XL-2** | | 0.3 | 0.3 | 0.3 | 0.3 | 0.3 |
| Benzotriazole*** | | 0.01 | 0.01 | 0.01 | 0.01 | 0.01 |
| Potassium hydroxide | | 0.1 | | | | |

Note)
EDTA*: Sodium ethylenediamine tetraacetate (metal masking agent)
Proxel XL-2**: Preservative (a product of Zeneca K.K.)
Benzotriazole***: Rust preventive
PFC2#: Projet Fast Cyan 2 (a product of Zeneca K.K.)

TABLE 10

| Ink set 3c | | Yellow | Deep magenta | Light magenta | Deep cyan | Light cyan |
|---|---|---|---|---|---|---|
| Dye | Yellow | (Y-1) 0.5 (Y-4) 2.0 | | | | |
| | Deep magenta | | (M-8) 3.5 | | | |
| | Light magenta | | | (LM-1) 3.0 | | |
| | Deep cyan | | | | PFC2# 4.5 | |
| | Light cyan | | | | | C.I. Direct Blue 86 1.5 |
| Glycerin | | 8 | 8 | 5 | 10 | 5 |
| Triethylene glycol | | 5 | 5 | 10 | 4 | 10 |
| 2-Pyrrolidone | | 5 | 5 | 5 | 5 | 5 |
| Urea | | 5 | 5 | 5 | 5 | 5 |
| Dipropylene glycol monobutyl ether | | 10 | 10 | 10 | 10 | 10 |

TABLE 10-continued

| Ink set 3c | Yellow | Deep magenta | Light magenta | Deep cyan | Light cyan |
|---|---|---|---|---|---|
| Olfine STG | 0.5 | 0.5 | 0.5 | 0.5 | 0.5 |
| EDTA* | 0.02 | 0.02 | 0.02 | 0.02 | 0.02 |
| Proxel XL-2** | 0.3 | 0.3 | 0.3 | 0.3 | 0.3 |
| Benzotriazole*** | 0.01 | 0.01 | 0.01 | 0.01 | 0.01 |

Note)
EDTA*: Sodium ethylenediamine tetraacetate (metal masking agent)
Proxel XL-2**: Preservative (a product of Zeneca K.K.)
Benzotriazole***: Rust preventive
PFC2#: Projet Fast Cyan 2 (a product of Zeneca K.K.)

TABLE 11

| Ink set 4c (comp. ex.) | | Yellow | Deep magenta | Light magenta | Deep cyan | Light cyan |
|---|---|---|---|---|---|---|
| Dye | Yellow | (Y-1) 0.7 (Y-4) 2.8 | | | | |
| | Deep magenta | | (M-1) 2.4 | | | |
| | Light magenta | | | (M-1) 1.8 | | |
| | Deep cyan | | | | C.I. Direct Blue 199 3.5 | |
| | Light cyan | | | | | C.I. Direct Blue 199 1.0 |
| Glycerin | | 10 | 10 | 10 | 10 | 10 |
| Triethylene glycol | | 8 | 5 | 10 | 5 | 10 |
| Triethanolamine | | | 1 | 0.3 | | |
| Diethylene glycol monobutyl ether | | 10 | | | | |
| Triethylene glycol monobutyl ether | | | 10 | 10 | 10 | 10 |
| Olfine STG | | 1 | | | | |
| Olfine E 1010 | | | 1 | 1 | 1 | 1 |
| EDTA* | | 0.02 | 0.02 | 0.02 | 0.02 | 0.02 |
| Proxel XL-2** | | 0.3 | 0.3 | 0.3 | 0.3 | 0.3 |
| Benzotriazole*** | | 0.01 | 0.01 | 0.01 | 0.01 | 0.01 |
| Potassium hydroxide | | | 0.1 | 0.03 | | |

Note)
EDTA*: Sodium ethylenediamine tetraacetate (metal masking agent)
Proxel XL-2**: Preservative (a product of Zeneca K.K.)
Benzotriazole***: Rust preventive

TABLE 12

| Ink set 5c (comp. ex.) | | Yellow | Deep magenta | Light magenta | Deep cyan | Light cyan |
|---|---|---|---|---|---|---|
| Dye | Yellow | (Y-1) 0.7 (Y-4) 2.8 | | | | |
| | Deep magenta | | (LM-1) 6.0 | | | |
| | Light magenta | | | (LM-1) 2.0 | | |
| | Deep cyan | | | | C.I. Direct Blue 199 3.5 | |
| | Light cyan | | | | | C.I. Direct Blue 199 1.0 |
| Glycerin | | 10 | 10 | 10 | 10 | 10 |
| Triethylene glycol | | 8 | 5 | 10 | 5 | 10 |
| Triethanolamine | | | 1 | 0.3 | | |
| Diethylene glycol monobutyl ether | | 10 | | | | |
| Triethylene glycol monobutyl ether | | | 10 | 10 | 10 | 10 |
| Olfine STG | | 1 | | | | |
| Olfine E 1010 | | | 1 | 1 | 1 | 1 |
| EDTA* | | 0.02 | 0.02 | 0.02 | 0.02 | 0.02 |
| Proxel XL-2** | | 0.3 | 0.3 | 0.3 | 0.3 | 0.3 |
| Benzotriazole*** | | 0.01 | 0.01 | 0.01 | 0.01 | 0.01 |
| Potassium hydroxide | | | 0.1 | 0.03 | | |

Note)
EDTA*: Sodium ethylenediamine tetraacetate (metal masking agent)
Proxel XL-2**: Preservative (a product of Zeneca K.K.)
Benzotriazole***: Rust preventive

TABLE 13

| Ink set 6c (comp. ex.) | | Yellow | Deep magenta | Light magenta | Deep cyan | Light cyan |
|---|---|---|---|---|---|---|
| Dye | Yellow | C.I. Acid Yellow 23 2.0 | | | | |
| | Deep magenta | | C.I. Reactive Red 180 2.4 | | | |
| | Light magenta | | | (LM-1) 0.8 | | |
| | Deep cyan | | | | C.I. Direct Blue 199 3.5 | |
| | Light cyan | | | | | C.I. Direct Blue 199 0.9 |
| Glycerin | | 10 | 10 | 10 | 10 | 10 |
| Triethylene glycol | | 8 | 5 | 10 | 5 | 10 |
| Triethanolamine | | | 1 | 0.3 | | |
| Diethylene glycol monobutyl ether | | 10 | | | | |
| Triethylene glycol monobutyl ether | | | 10 | 10 | 10 | 10 |
| Olfine STG | | 1 | | | | |
| Olfine E 1010 | | | 1 | 1 | 1 | 1 |
| EDTA* | | 0.02 | 0.02 | 0.02 | 0.02 | 0.02 |
| Proxel XL-2** | | 0.3 | 0.3 | 0.3 | 0.3 | 0.3 |
| Benzotriazole*** | | 0.01 | 0.01 | 0.01 | 0.01 | 0.01 |
| Potassium hydroxide | | | 0.1 | 0.03 | | |

Note)
EDTA*: Sodium ethylenediamine tetraacetate (metal masking agent)
Proxel XL-2**: Preservative (a product of Zeneca K.K.)
Benzotriazole***: Rust preventive

TABLE 14

| Ink set 7c (comp. ex.) | | Yellow | Deep magenta | Light magenta | Deep cyan | Light cyan |
|---|---|---|---|---|---|---|
| Dye | Yellow | (Y-5) 0.5 (Y-8) 2.8 | | | | |
| | Deep magenta | | (M-1) 1.4 | | | |
| | Light magenta | | | C.I. Acid Red 52 0.7 | | |
| | Deep cyan | | | | C.I. Acid Blue 9 2.5 | |
| | Light cyan | | | | | C.I. Direct Blue 199 1.0 |
| Diethylene glycol | | 5 | 5 | 5 | 5 | 5 |
| Triethylene glycol | | 12 | 10 | 18 | 9 | 15 |
| Triethanolamine | | 1 | | | | |
| 2-Pyrrolidone | | | | 2 | | |
| Diethylene glycol monobutyl ether | | 10 | 10 | 10 | 10 | 10 |
| Olfine E 1010 | | | 1 | 1 | 1 | 1 |
| Olfine E 104 | | 1 | | | | |
| EDTA* | | 0.02 | 0.02 | 0.02 | 0.02 | 0.02 |
| Proxel XL-2** | | 0.3 | 0.3 | 0.3 | 0.3 | 0.3 |
| Benzotriazole*** | | 0.01 | 0.01 | 0.01 | 0.01 | 0.01 |
| Potassium hydroxide | | 0.1 | 0.1 | | | |

Note)
EDTA*: Sodium ethylenediamine tetraacetate (metal masking agent)
Proxel XL-2**: Preservative (a product of Zeneca K.K.)
Benzotriazole***: Rust preventive Test on Evaluation of Ink Sets The ink sets thus obtained were evaluated by the following tests 1C to 3C using the following recording media (1) to (4). The recording medium (1) is the so-called "plain paper," and the recording media (2) to (4) are specialty recording media for ink jet printers.

(Recording Media)
(1) Xerox 4024 (Xerox Corp., U.S.A.)
(2) EPSON Superfine Paper (Epson Hanbai Corporation)
(3) EPSON Specialty Gloss Paper for photographs (Epson Hanbai Corporation)
(4) EPSON Specialty Gloss Film (Epson Hanbai Corporation)

In the evaluation tests, an ink jet printer PM-770C (manufactured by Seiko Epson Corporation) was used.

The lightfastness was evaluated by a lightfastness test using a xenon fadeometer Ci35W (manufactured by Atlas Electric Device) as an acceleration tester for fastness to light.

Test 1C: Lightfastness

Each of the ink sets was loaded into an ink cartridge for PM-770C (Model IC5CL02, manufactured by Seiko Epson Corporation), and blotted images of red, blue, green, and composite black with a density of 70% were printed on the recording media (1) to (4).

In this case, printing was carried out under conditions controlled such that the red with a density of 70% was constituted by the deep magenta ink, the light magenta ink, and the yellow ink, the blue with a density of 70% was constituted by the deep magenta ink, the light magenta ink, the deep cyan ink, and the light cyan ink, the green with a density of 70% was constituted by the yellow ink, the deep cyan ink, and the light cyan ink, and the composite black with a density of 70% was constituted by the deep magenta ink, the light magenta ink, the deep cyan ink, the light cyan ink, the yellow ink, and the black ink. The black ink used was an original ink for PM-770C.

These print samples were subjected to a 60-hr lightfastness test using a xenon fadeometer Ci35W (manufactured by Atlas Electric Device). The difference between the color before the test and the color after the test, $\Delta E^*_{ab}$, was determined by equation (i), and evaluated according to the following criteria.

$$\Delta E^*_{ab} = [(\Delta L^*)^2 + (\Delta a^*)^2 + (\Delta b^*)^2]^{1/2} \quad (i)$$

A: Color difference $\Delta E^*_{ab}$ of not more than 5
B: Color difference $\Delta E^*_{ab}$ of more than 5 to 10
C: Color difference $\Delta E^*_{ab}$ of more than 10 to 20
D: Color difference $\Delta E^*_{ab}$ of more than 20
The results were as summarized in Tables 15.

TABLE 15

Test 1C: Lightfastness

| Print with density 70% | | Recording medium | | | |
|---|---|---|---|---|---|
| | | (1) | (2) | (3) | (4) |
| Ink set 1c | Red | A | A | A | A |
| | Blue | A | A | A | A |
| | Green | A | A | A | A |
| | Black | A | A | A | A |
| Ink set 2c | Red | A | A | A | A |
| | Blue | A | A | A | A |
| | Green | A | A | A | A |
| | Black | A | A | A | A |
| Ink set 3c | Red | A | A | A | A |
| | Blue | A | A | A | A |
| | Green | A | A | A | A |
| | Black | A | A | A | A |
| Ink set 4c | Red | B | B | B | B |
| | Blue | B | C | C | C |
| | Green | A | A | A | A |
| | Black | D | D | D | D |
| Ink set 5c | Red | A | A | A | A |
| | Blue | A | A | A | A |
| | Green | A | A | A | A |
| | Black | A | A | A | A |
| Ink set 6c | Red | C | C | C | C |
| | Blue | B | B | B | B |
| | Green | D | D | D | D |
| | Black | B | B | B | C |
| Ink set 7c | Red | D | D | D | D |
| | Blue | D | D | D | D |
| | Green | D | D | D | D |
| | Black | D | D | D | D |

Test 2C: Color Reproduction Range

The ink sets prepared above were loaded into ink cartridges for PM-770C, and, for each of these ink sets, a patch pattern with gradation of 100 density levels was printed on the recording medium (3) for each of yellow, magenta, cyan, red, blue, and green. For the patches, lightness (L*) and hue (a*, b*) were measured. a* was plotted as X axis, b* as Y axis, and L* as Z axis to determine a color solid space (a color reproduction range).

The color reproduction range of the original ink set for PM-770C was presumed to be 100% and was compared with the color reproduction range of each ink set sample.

Test 3C: Recovery from Clogging

Each of the ink sets 1b to 7b was loaded into a printing head of PM-770C, and allowed to stand without capping the printing head under an environment of 40° C. for one month. After the standing for one month, the number of cleaning operations required for all the nozzles to normally eject the ink compositions in the ink set was counted, and the recovery from clogging was evaluated according to the following criteria.

A: Recovered by repeating the cleaning operation twice or less

B: Recovered by repeating the cleaning operation three to five times

C: Recovered by repeating the cleaning operation six to ten times

D: Not recovered even by repeating the cleaning operation ten times

The results of evaluation in the tests 2C and 3C were as summarized in Table 16.

TABLE 16

| | Ink set | | | | | | | |
|---|---|---|---|---|---|---|---|---|
| | 1c | 2c | 3c | 4c | 5c | 6c | 7c | PM-770C |
| Test 2C: Color reproduction range | 105% | 101% | 110% | 100% | 88% | 94% | 110% | 100% |
| Test 3C: Recovery from clogging | A | A | A | A | D | B | A | A |

Evaluation Test D

Preparation of Ink Sets

Ingredients specified in Tables 1 to 6 were mixed together in a mixing ratio specified in Tables 17 to 21. The resultant solutions were filtered under pressure through a membrane filter having a pore diameter of 1 μm to prepare ink compositions, and were then used in combination to prepare ink sets 1d to 10d. In the following tables, the amount of each ingredient is in wt % of the ingredient based on the total weight of the ink composition. The balance consists of water. The ink sets id to 6d are ink sets of examples of the present invention, and the ink sets 7d to 10d are comparative ink sets.

TABLE 17

| | Ink set 1d | | | | | Ink set 2d | | | | |
|---|---|---|---|---|---|---|---|---|---|---|
| | M | LM | Y | C | LC | M | LM | Y | C | LC |
| M-6 | 2.5 | | | | | | | | | |
| M-10 | | | | | | | 1.5 | | | |

TABLE 17-continued

|  | Ink set 1d | | | | | Ink set 2d | | | | |
| --- | --- | --- | --- | --- | --- | --- | --- | --- | --- | --- |
|  | M | LM | Y | C | LC | M | LM | Y | C | LC |
| LM-2 |  | 1.0 |  |  |  |  |  |  |  |  |
| LM-11 |  |  |  |  |  |  | 1.5 |  |  |  |
| C.I. Acid Red 52 |  |  |  |  |  |  |  |  |  |  |
| C.I. Acid Red 249 |  |  |  |  |  |  |  |  |  |  |
| C.I. Direct Yellow 86 |  |  | 0.4 |  |  |  |  | 1.0 |  |  |
| C.I. Direct Yellow 132 |  |  | 0.8 |  |  |  |  | 2.0 |  |  |
| C.I. Acid Yellow 23 |  |  |  |  |  |  |  |  |  |  |
| C.I. Direct Blue 86 |  |  |  |  |  |  |  |  |  |  |
| C.I. Direct Blue 199 |  |  |  | 2.0 |  |  |  |  | 2.5 |  |
| C.I. Acid Blue 9 |  |  |  |  |  |  |  |  |  |  |
| Triethylene glycol monobutyl ether |  |  |  |  |  |  |  |  |  |  |
| Diethylene glycol monobutyl ether | 10 |  | 10 | 10 |  |  |  |  |  |  |
| Polyethylene glycol monobutyl ether | 10 |  | 10 | 10 |  | 10 |  | 10 | 10 |  |
| Diethylene glycol | 10 |  | 10 | 10 |  | 10 |  | 10 | 10 |  |
| Olfine E 1010 |  |  |  |  |  |  |  |  |  |  |
| Olfine STG |  |  |  |  |  | 2.0 |  | 2.0 | 2.0 |  |
| Triethanolamine | 1.0 |  | 1.0 | 1.0 |  | 0.5 |  | 0.5 | 0.5 |  |
| EDTA | 0.01 |  | 0.01 | 0.01 |  | 0.01 |  | 0.01 | 0.01 |  |
| Proxel XL-2 | 0.3 |  | 0.3 | 0.3 |  | 0.3 |  | 0.3 | 0.3 |  |

TABLE 18

|  | Ink set 3d | | | | | Ink set 4d | | | | |
| --- | --- | --- | --- | --- | --- | --- | --- | --- | --- | --- |
|  | M | LM | Y | C | LC | M | LM | Y | C | LC |
| M-3 | 2.0 |  |  |  |  |  |  |  |  |  |
| M-7 |  |  |  |  |  | 2.5 |  |  |  |  |
| LM-1 |  | 1.5 |  |  |  |  |  |  |  |  |
| LM-4 |  |  |  |  |  |  | 1.0 |  |  |  |
| C.I. Acid Red 52 |  |  |  |  |  |  |  |  |  |  |
| C.I. Acid Red 249 |  |  |  |  |  |  |  |  |  |  |
| C.I. Direct Yellow 86 |  |  | 2.0 |  |  |  |  | 0.5 |  |  |
| C.I. Direct Yellow 132 |  |  | 0.8 |  |  |  |  | 0.5 |  |  |
| C.I. Acid Yellow 23 |  |  |  |  |  |  |  |  |  |  |
| C.I. Direct Blue 86 |  |  |  | 2.0 | 0.5 |  |  |  | 2.5 | 1.0 |
| C.I. Direct Blue 199 |  |  |  |  |  |  |  |  |  |  |
| C.I. Acid Blue 9 |  |  |  |  |  |  |  |  |  |  |
| Triethylene glycol monobutyl ether | 10 | 10 | 10 | 10 | 10 |  |  |  |  |  |
| Diethylene glycol monobutyl ether |  |  |  |  |  | 12 | 12 | 12 | 12 | 12 |
| Polyethylene glycol monobutyl ether | 10 | 10 | 10 | 10 | 10 | 10 | 10 | 10 | 10 | 10 |
| Diethylene glycol | 10 | 10 | 10 | 10 | 10 | 10 | 10 | 10 | 10 | 10 |
| Olfine E 1010 | 1.0 | 1.0 | 1.0 | 1.0 | 1.0 |  |  |  |  |  |
| Olfine STG |  |  |  |  |  | 0.5 | 0.5 | 0.5 | 0.5 | 0.5 |
| Triethanolamine | 1.0 | 1.0 | 1.0 | 1.0 | 1.0 | 0.5 | 0.5 | 0.5 | 0.5 | 0.5 |
| EDTA | 0.01 | 0.01 | 0.01 | 0.01 | 0.01 | 0.01 | 0.01 | 0.01 | 0.01 | 0.01 |
| Proxel XL-2 | 0.3 | 0.3 | 0.3 | 0.3 | 0.3 | 0.3 | 0.3 | 0.3 | 0.3 | 0.3 |

TABLE 19

|  | Ink set 5d | | | | | Ink set 6d | | | | |
| --- | --- | --- | --- | --- | --- | --- | --- | --- | --- | --- |
|  | M | LM | Y | C | LC | M | LM | Y | C | LC |
| M-3 | 3.5 |  |  |  |  |  |  |  |  |  |
| M-7 |  |  |  |  |  | 2.5 |  |  |  |  |
| LM-1 |  | 2.5 |  |  |  |  |  |  |  |  |
| LM-4 |  |  |  |  |  |  | 2.0 |  |  |  |
| C.I. Acid Red 52 |  |  |  |  |  |  |  |  |  |  |
| C.I. Acid Red 249 |  |  |  |  |  |  |  |  |  |  |
| C.I. Direct Yellow 86 |  |  | 1.0 |  |  |  |  | 1.0 |  |  |
| C.I. Direct Yellow 132 |  |  | 2.0 |  |  |  |  | 1.5 |  |  |
| C.I. Acid Yellow 23 |  |  |  |  |  |  |  |  |  |  |
| C.I. Direct Blue 86 |  |  |  |  |  |  |  |  |  |  |
| C.I. Direct Blue 199 |  |  |  | 2.5 | 1.0 |  |  |  | 3.5 | 0.9 |
| C.I. Acid Blue 9 |  |  |  |  |  |  |  |  |  |  |
| Triethylene glycol monobutyl ether |  |  |  |  |  | 10 | 10 | 10 | 10 | 10 |
| Diethylene glycol monobutyl ether |  |  |  |  |  |  |  |  |  |  |
| Polyethylene glycol monobutyl ether | 10 | 10 | 10 | 10 | 10 | 10 | 10 | 10 | 10 | 10 |
| Diethylene glycol | 1.0 | 1.0 | 1.0 | 1.0 | 1.0 | 10 | 10 | 10 | 10 | 10 |

TABLE 19-continued

|  | Ink set 5d | | | | | Ink set 6d | | | | |
| --- | --- | --- | --- | --- | --- | --- | --- | --- | --- | --- |
|  | M | LM | Y | C | LC | M | LM | Y | C | LC |
| Olfine E 1010 | 1.0 | 1.0 | 1.0 | 1.0 | 1.0 | | | | | |
| Olfine STG | | | | | | | | | | |
| Triethanolamine | 1.0 | 1.0 | 1.0 | 1.0 | 1.0 | 0.5 | 0.5 | 0.5 | 0.5 | 0.5 |
| EDTA | 0.01 | 0.01 | 0.01 | 0.01 | 0.01 | 0.01 | 0.01 | 0.01 | 0.01 | 0.01 |
| Proxel XL-2 | 0.3 | 0.3 | 0.3 | 0.3 | 0.3 | 0.3 | 0.3 | 0.3 | 0.3 | 0.3 |

TABLE 20

|  | Ink set 7d (comp. ex.) | | | | | Ink set 8d (comp. ex.) | | | | |
| --- | --- | --- | --- | --- | --- | --- | --- | --- | --- | --- |
|  | M | LM | Y | C | LC | M | LM | Y | C | LC |
| C.I. Acid Red 52 | 1.5 | | | | | 2.5 | 0.7 | | | |
| C.I. Acid Red 249 | 1.5 | | | | | | | | | |
| C.I. Direct Yellow 86 | | | | | | | | | | |
| C.I. Direct Yellow 132 | | | | | | | | | | |
| C.I. Acid Yellow 23 | | | 2.0 | | | | | 1.5 | | |
| C.I. Direct Blue 86 | | | | | | | | | | |
| C.I. Direct Blue 199 | | | | | | | | | | |
| C.I. Acid Blue 9 | | | | 3.5 | | | | | 2.5 | 1.0 |
| Triethylene glycol monobutyl ether | 12 | | 12 | 12 | | | | | | |
| Diethylene glycol monobutyl ether | | | | | | | | | | |
| Polyethylene glycol monobutyl ether | 10 | | 10 | 10 | | 10 | 10 | 10 | 10 | 10 |
| Diethylene glycol | 10 | | 10 | 10 | | 10 | 10 | 10 | 10 | 10 |
| Olfine E 1010 | | | | | | | | | | |
| Olfine STG | | | | | | 2.0 | 2.0 | 2.0 | 2.0 | 2.0 |
| Triethanolamine | 1.0 | | 1.0 | 1.0 | | 0.5 | 0.5 | 0.5 | 0.5 | 0.5 |
| EDTA | 0.01 | | 0.01 | 0.01 | | 0.01 | 0.01 | 0.01 | 0.01 | 0.01 |
| Proxel XL-2 | 0.3 | | 0.3 | 0.3 | | 0.3 | 0.3 | 0.3 | 0.3 | 0.3 |

TABLE 21

|  | Ink set 9d (comp. ex.) | | | | | Ink set 10d (comp. ex.) | | | | |
| --- | --- | --- | --- | --- | --- | --- | --- | --- | --- | --- |
|  | M | LM | Y | C | LC | M | LM | Y | C | LC |
| M-4 | 2.0 | | | | | 1.0 | | | | |
| LM-7 | 0.5 | | | | | | 0.5 | | | |
| C.I. Acid Red 52 | | | | | | 1.5 | 1.5 | | | |
| C.I. Acid Red 249 | 0.5 | | | | | | | | | |
| C.I. Direct Yellow 86 | | | 1.0 | | | | | | | |
| C.I. Direct Yellow 132 | | | | | | | | 2.0 | | |
| C.I. Acid Yellow 23 | | | 1.0 | | | | | 1.0 | | |
| C.I. Direct Blue 86 | | | | | | | | | | |
| C.I. Direct Blue 199 | | | | 3.0 | | | | | | |
| C.I. Acid Blue 9 | | | | | | | | | 3.5 | 0.8 |
| Triethylene glycol monobutyl ether | | | | | | 10 | 10 | 10 | 10 | 10 |
| Diethylene glycol monobutyl ether | 10 | | 10 | 10 | | | | | | |
| Polyethylene glycol monobutyl ether | 10 | | 10 | 10 | | 10 | 10 | 10 | 10 | 10 |
| Diethylene glycol | 10 | | 10 | 10 | | 10 | 10 | 10 | 10 | 10 |
| Olfine E 1010 | 1.0 | | 1.0 | 1.0 | | | | | | |
| Olfine STG | | | | | | 0.5 | 0.5 | 0.5 | 0.5 | 0.5 |
| Triethanolamine | 1.0 | | 1.0 | 1.0 | | 0.5 | 0.5 | 0.5 | 0.5 | 0.5 |
| EDTA | 0.01 | | 0.01 | 0.01 | | 0.01 | 0.01 | 0.01 | 0.01 | 0.01 |
| Proxel XL-2 | 0.3 | | 0.3 | 0.3 | | 0.3 | 0.3 | 0.3 | 0.3 | 0.3 |

Abbreviations used in Tables 17 to 21 are as follows.

EDTA represents dihydrogen disodium ethylenediaminetetraacetate (chelating agent).

Olfine E 1010 and Olfine STG are tradenames for acetylene glycol surfactants manufactured by Nissin Chemical Industry Co., Ltd.

Proxel XL-2 is a tradename for a preservative manufactured by Zeneca K.K.

Tests on Evaluation of Ink Compositions

The ink compositions thus obtained were evaluated by the following tests 1D to 3D using the following recording media (1) to (4). The recording medium (1) is the so-called "plain paper," and the recording media (2) to (4) are specialty recording media for ink jet printers.

(Recording Media)
(1) Xerox 4024 (Xerox Corp., U.S.A.)
(2) EPSON Superfine Paper (Epson Hanbai Corporation)
(3) EPSON Specialty Gloss Paper for photographs (Epson Hanbai Corporation)
(4) EPSON Specialty Gloss Film (Epson Hanbai Corporation)

In the evaluation tests, an ink jet printer PM-770C (used with a cartridge for six colors; manufactured by Seiko Epson Corporation) and an ink jet printer MJ-930C (used with a cartridge for four colors; manufactured by Seiko Epson Corporation) were used.

The lightfastness was evaluated by a lightfastness test using a xenon fadeometer Ci35W (manufactured by Atlas Electric Device) as an acceleration tester for fastness to light.

Test 1D: Lightfastness

For ink sets 3d to 6d, 8d, and 10d, deep magenta, light magenta, yellow, deep cyan, and light cyan inks were loaded into respective ink chambers in an ink cartridge for PM-770C (manufactured by Seiko Epson corporation), and blotted images of magenta, yellow, cyan, red, blue, green, and composite black were printed on the recording media (1) to (4).

In this case, printing was carried out under conditions controlled such that the red was constituted by the deep magenta ink, the light magenta ink, and the yellow ink, the blue was constituted by the deep magenta ink, the light magenta ink, the deep cyan ink, and the light cyan ink, the green was constituted by the yellow ink, the deep cyan ink, and the light cyan ink, and the composite black was constituted by the deep magenta ink, the light magenta ink, the yellow ink, the deep cyan ink, the light cyan ink, and the black ink.

For ink sets 1d, 2d, 7d, and 9d, yellow, and cyan inks were loaded into respective ink chambers in an ink cartridge for MJ-930C (manufactured by Seiko Epson Corporation), and blotted images of magenta, yellow, cyan, red, blue, green, and composite black were printed on the recording media (1) to (4).

These print samples were irradiated with light for 60 hr by means of a xenon fadeometer Ci35A (manufactured by Atlas Electric Device). In this case, hue (L*, a*, b*) was determined before and after light irradiation by means of a GRETAG densitometer (manufactured by GRETAG, Ltd.), followed by the determination of the difference between color before the test and color after the test, ΔE*ab, by equation (i). The lightfastness was evaluated from the results according to the following criteria.

$$\Delta E^*_{ab} = [(\Delta L^*)^2 + (\Delta a^*)^2 + (\Delta b^*)^2]^{1/2} \quad (i)$$

A: Color difference $\Delta E^*_{ab}$ of not more than 5
B: Color difference $\Delta E^*_{ab}$ of more than 5 to 10
C: Color difference $\Delta E^*_{ab}$ of more than 10 to 20
D: Color difference $\Delta E^*_{ab}$ of more than 20

Test 2D: Bleeding

For each ink set, blotted images of each color were formed on the recording media (1) to (4). These print samples were inspected for color bleeding or uneven color mixing in boundaries of different colors. The bleeding was evaluated from the results according to the following criteria.

A: There was no bleeding.
B: There was color bleeding or uneven color mixing, in slight portion, on a level causing no practical problem.
C: There was significant color bleeding or uneven color mixing on a level causing slight practical problem.
D: There was severe color bleeding.

Test 3D: Recovery from Nozzle Clogging

Inks in each ink set were loaded into a printing head. After the ejection of the inks through the nozzles of the head without any problem was confirmed by inspection of prints, the printer was stopped, and allowed to stand without capping the printing head under an environment of 40° C. for one month. After the standing for one month, the power supply of the printer was turned on to perform cleaning operations until all the nozzles could normally eject the ink composition. The necessary number of cleaning operations was counted. The recovery from nozzle clogging was evaluated from the results according to the following criteria.

A: Recovered by conducting the cleaning operation twice or less
B: Recovered by repeating the cleaning operation three to five times
C: Recovered by repeating the cleaning operation six to ten times
D: Not recovered even by repeating the cleaning operation ten times The results of the tests 1D to 3D were as summarized in Table 22.

TABLE 22

| | Ink set | | | | | | | | | |
|---|---|---|---|---|---|---|---|---|---|---|
| | 1d | 2d | 3d | 4d | 5d | 6d | 7d | 8d | 9d | 10d |
| Test 1D | | | | | | | | | | |
| Xerox 4024 | A | A | A | A | A | A | C | C | B | B |
| Superfine | A | A | A | A | A | A | C | C | B | B |
| Specialty Gloss Paper | A | A | A | A | A | A | C | C | B | B |
| Specialty Gloss Film | A | A | A | A | A | A | C | C | B | B |
| Test 2D | | | | | | | | | | |
| Xerox 4024 | A | A | A | A | A | A | B | B | A | A |
| Superfine | A | A | A | A | A | A | A | A | A | A |
| Specialty Gloss Paper | A | A | A | A | A | A | A | A | A | A |
| Specialty Gloss Film | A | A | A | A | A | A | A | A | A | A |
| Test 3D | A | A | A | A | A | A | A | A | A | A |

Evaluation Test E: Color Reproduction

For yellow, magenta, and cyan inks used in the ink sets in the evaluation tests C and D, color calculation was carried out using a spectrophotometer U-3300 (manufactured by Hitachi, Ltd.) to determine the hue (L*, a*, b*) of the inks. For magenta and cyan inks, the hue was also determined on the light inks. The measurement was carried out under conditions of D65 as a standard light source, field of view 2 degrees, and measurement wavelength 300 to 800 nm.

The results were as shown in Table 23 and FIG. 1. In FIG. 1, inks according to the present invention had hues falling within respective portions surrounded by dotted lines. When the hues of the inks fall within the respective portions surrounded by dotted lines, good color reproduction and good color tone can be realized.

TABLE 23

| Ink set | | a* | b* | Ink set | | a* | b* |
|---|---|---|---|---|---|---|---|
| 1c | Y | −5 | 95 | 4c | Y | −5 | 95 |
| | M | 75 | −5 | | M | 75 | −5 |
| | LM | 17 | −3 | | LM | 35 | −3 |
| | C | −45 | −55 | | C | −45 | −50 |
| | LC | −13 | −22 | | LC | −13 | −20 |
| 2c | Y | −1 | 90 | 5c | Y | −5 | 95 |
| | M | 72 | −8 | | M | 46 | −6 |
| | LM | 20 | 5 | | LM | 17 | −3 |
| | C | −42 | −50 | | C | −42 | −45 |
| | LC | −10 | −16 | | LC | −10 | −12 |
| 3c | Y | −5 | 83 | 6c | Y | 3 | 107 |
| | M | 69 | 4 | | M | 65 | −5 |
| | LM | 28 | 9 | | LM | 9 | 0 |
| | C | −36 | −45 | | C | −45 | −50 |
| | LC | −10 | −18 | | LC | −13 | −18 |

TABLE 23-continued

| Ink set | | a* | b* | Ink set | | a* | b* |
|---|---|---|---|---|---|---|---|
| 1d | Y | 10 | 72 | 7c | Y | 2 | 87 |
| | M | 78 | 10 | | M | 49 | −1 |
| | C | −37 | −48 | | LM | 42 | −17 |
| 2d | Y | 12 | 85 | | C | −48 | −68 |
| | M | 70 | 6 | | LC | −13 | −20 |
| | C | −35 | −44 | 7d | Y | 3 | 107 |
| 3d | Y | 17 | 85 | | M | 80 | −24 |
| | M | 70 | −5 | | C | −40 | −60 |
| | LM | 15 | −3 | 8d | Y | 8 | 98 |
| | C | −30 | −42 | | M | 87 | −36 |
| | LC | −12 | −21 | | LM | 40 | −17 |
| 4d | Y | 5 | 60 | | C | −46 | −55 |
| | M | 79 | −6 | | LC | −28 | −28 |
| | LM | 10 | −1 | 9d | Y | 10 | 88 |
| | C | −32 | −44 | | M | 75 | 7 |
| | LC | −17 | −27 | | C | −40 | −43 |
| 5d | Y | 12 | 85 | 10d | Y | 5 | 90 |
| | M | 69 | 4 | | M | 81 | −2 |
| | LM | 30 | 9 | | LM | 53 | −28 |
| | C | −35 | −44 | | C | −54 | −69 |
| | LC | −13 | −20 | | LC | −20 | −26 |
| 6d | Y | 10 | 80 | | | | |
| | M | 73 | −8 | | | | |
| | LM | 22 | 6 | | | | |
| | C | −45 | −50 | | | | |
| | LC | −13 | −18 | | | | |

What is claimed is:

1. An ink set comprising first and second magenta ink compositions different from each other in color density, wherein the first magenta ink composition has a higher color density than the second magenta ink composition which has a lower color density, said first magenta ink composition with higher color density containing as a colorant a compound represented by formula (III)

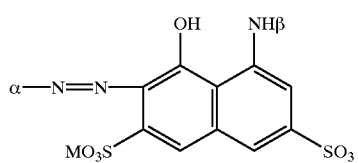

(III)

wherein

α represents a $C_1$–$C_4$ alkyl or alkoxy group or an OH—, $SO_3H$—, or COOM-substituted phenyl or naphthyl group;

β represents a hydrogen atom or a group represented by formula

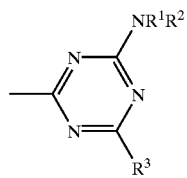

wherein $R^1$ represents a hydrogen atom or an OH— or COOH-substituted $C_1$–$C_4$ alkyl group, $R^2$ represents an OH—, $OCH_3$—, $OC_2H_5$—, $SO_3M$—, or COOM-substituted $C_1$–$C_4$ alkyl or phenyl group, and $R^3$ represents an OH, COOH, or $NHR^4$ wherein $R^4$ represents an $SO_3M$— or COOH-substituted $C_1$–$C_4$ alkyl group; and M represents a hydrogen atom, lithium, sodium, potassium, ammonium or an organic amine, said second magenta ink composition with lower color density containing as a colorant a compound represented by formula (IV):

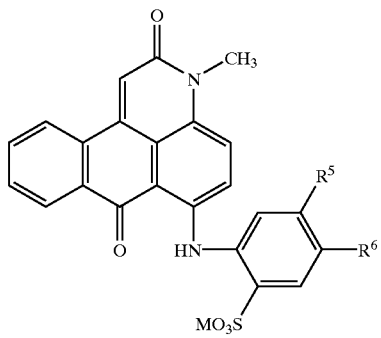

(IV)

wherein

M represents a hydrogen atom, lithium, sodium, potassium, ammonium, or an organic amine;

$R^5$ represents a hydrogen atom, a chlorine atom or a group represented by formula

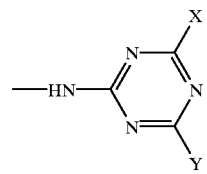

wherein

X represents an anilino group substituted by at least one $SO_3M$ and

Y represents OH, a chlorine atom, or a morpholino group; and $R^6$ represents a hydrogen atom, a chlorine atom, $SO_3M$, or a $C_1$–$C_4$ alkyl group.

2. The ink set according to claim 1, wherein the first magenta ink composition with higher color density contains 1.5 to 3.5% by weight of the compound represented by formula (III) and the second magenta ink composition with lower color density contains 1 to 3% by weight of the compound represented by formula (IV).

3. A magenta ink composition comprising as a colorant (a) the compound represented by formula (III)

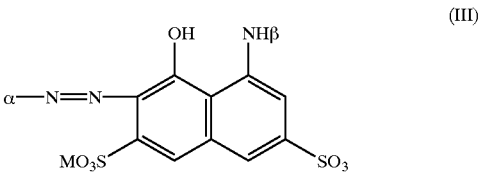

(III)

wherein

α represents a $C_1$–$C_4$ alkyl or alkoxy group or an OH—, $SO_3H$—, or COOM-substituted phenyl or naphthyl group;

β represents a hydrogen atom or a group represented by formula

[Structure: triazine with NR¹R² and R³ substituents]

wherein
- $R^1$ represents a hydrogen atom or an OH— or COOH-substituted $C_1$–$C_4$ alkyl group,
- $R^2$ represents an OH—, $OCH_3$—, $OC_2H_5$—, $SO_3M$—, or COOM-substituted $C_1$–$C_4$ alkyl or phenyl group, and
- $R^3$ represents an OH, COOH, or $NHR^4$ wherein $R^4$ represents an $SO_3M$— or COOH-substituted $C_1$–$C_4$ alkyl group; and
- M represents a hydrogen atom, lithium, sodium, potassium, ammonium, or an organic amine, and (b) the compound represented by formula (IV)

(IV)

[Structure: benzanthrone/naphthoquinone derivative with N-CH₃, and anilino group bearing R⁵, R⁶, and MO₃S substituents]

wherein
- M represents a hydrogen atom, lithium, sodium, potassium, ammonium, or an organic amine;
- $R^5$ represents a hydrogen atom, a chlorine atom or a group represented by formula

[Structure: triazine with —HN—, X, Y substituents]

wherein
- X represents an anilino group substituted by at least one $SO_3M$ and
- Y represents OH, a chlorine atom, or a morpholino group; and
- $R^6$ represents a hydrogen atom, a chlorine atom, $SO_3M$, or a $C_1$–$C_4$ alkyl group, said compounds represented by formulas (III) and (IV) being present in the magenta ink composition in a weight ratio of 1:1 to 1:5.

4. The magenta ink composition according to claim 3, wherein the colorant is contained in an amount of 0.5 to 5% by weight based on the total amount of the ink composition.

5. An ink set comprising the magenta ink composition according to claim 3.

6. The ink set according to claim 1, which further comprises a yellow ink composition and a cyan ink composition.

7. An ink set comprising: a yellow ink composition; first and second magenta ink compositions different from each other in color density, the first magenta ink composition having a higher color density than the second magenta ink composition which has a lower color density; and first and second cyan ink compositions different from each other in color density, the first cyan ink composition having a higher color density than the second cyan ink composition which has a lower color density, said yellow ink composition containing as a colorant a compound represented by formula (I) and/or a compound represented by formula (II):

(I)

[Structure: —N=N—phenyl(R₁)—NH—CONH—phenyl(R₁')—N=N—A']

(II)

[Structure: —N=N—phenyl(R₂)—NH—triazine(NHC₂H₄OH)—NH—phenyl(R₂')—N=N—A']

wherein
- $R_1$, $R_1'$, $R_2$, and $R_2'$ each independently represent $CH_3$ or $OCH_3$; and
- A and A' each independently represent a group having a structure selected from the group consisting of

[Naphthyl–$(SO_3M)_n$], [Phenyl–$(SO_3M)_n$], [Naphthyl–$(COOM)_n$, and], [Phenyl–$(COOM)_n$]

wherein
- M represents a hydrogen atom, lithium, sodium, potassium, ammonium, or an organic amine; and
- n is an integer of 1 or 2, said first magenta ink composition with higher color density containing as a colorant a compound represented by formula (III):

(III)

[Structure: naphthalene with OH, NHβ, α—N=N—, $MO_3S$, $SO_3$ substituents]

wherein
- α represents a $C_1$–$C_4$ alkyl or alkoxy group or an OH—, $SO_3H$—, or COOM-substituted phenyl or naphthyl group;
- β represents a hydrogen atom or a group represented by formula

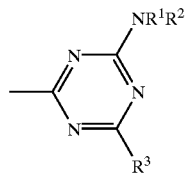

wherein
R¹ represents a hydrogen atom or an OH— or COOH-substituted $C_1$–$C_4$ alkyl group,
R² represents an OH—, OCH₃—, OC₂H₅—, SO₃M—, or COOM-substituted $C_1$–$C_4$ alkyl or phenyl group, and
R³ represents an OH, COOH, or NHR⁴ wherein R⁴ represents an SO₃M— or COOH-substituted $C_1$–$C_4$ alkyl group; and
M represents a hydrogen atom, lithium, sodium, potassium, ammonium, or an organic amine,
and/or a compound represented by formula (IV):

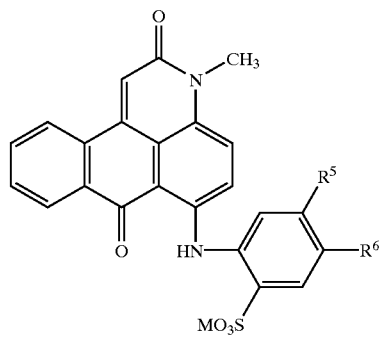

wherein
M represents a hydrogen atom, lithium, sodium, potassium, ammonium, or an organic amine;
R⁵ represents a hydrogen atom, a chlorine atom or a group represented by formula

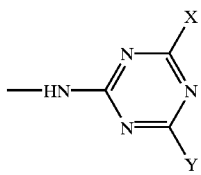

wherein
X represents an anilino group substituted by at least one SO₃M and
Y represents OH, a chlorine atom, or a morpholino group; and
R⁶ represents a hydrogen atom, a chlorine atom, SO₃M, or a $C_1$–$C_4$ alkyl group,
said second magenta ink composition with lower color density containing as a colorant the compound represented by formula (III) and/or the compound represented by formula (IV),
said first cyan ink composition with higher color density and said second cyan ink composition with lower color density each containing as a colorant a compound represented by formula (V):

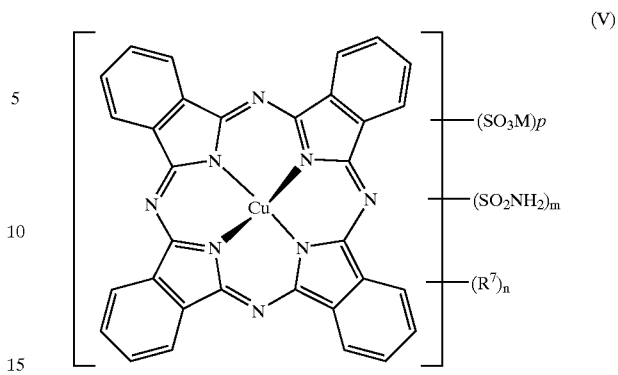

wherein
R⁷ represents OH, COOM, or R⁸COOM wherein R⁸ represents a $C_4$–$C_9$ alkyl group; and
p, m, and n are each 0 to 4 with (p+m+n)=4.

8. The ink set according to claim 7, wherein the content of the compound represented by formula (I) and/or the compound represented by formula (II) in the yellow ink composition is 0.3 to 4% by weight in total.

9. The ink set according to claim 7, wherein the yellow ink composition cons 0.3 to 4.0% by weight of the compound reseted by formula (I) and/or the compound represented by formula (II), first the magenta ink composition with higher color density contains 1.0 to 4.0% by weight of the compound represented by formula (II), the second magenta ink composition with lower color density contains 0.5 to 3.0% by weight of the compound represented by formula (IV), the first cyan ink composition with higher color density contains 1.0 to 4.0% by weight of the compound represented by formula (V), and the second cyan ink composition with lower color density contains 0.5 to 3.0% by weight of the compound represented by formula (V).

10. The ink set according to claim 7, wherein the first magenta ink composition with higher color density contains 1.5 to 3.5% by weight of the compound represented by formula (III) and the second magenta ink composition with lower color density contains 1 to 3% by weight of the compound represented by formula (IV).

11. The ink set according to claim 7, wherein the first magenta ink composition with higher color density and the second magenta ink composition with lower color density each contain the compound represented by formula (III) and the compound represented by formula (IV) in a weight ratio of 1:1 to 1:5.

12. The ink set according to claim 7, wherein the first cyan ink composition with higher color density contains 2.5 to 4.5% by weight of the compound represented by formula (V) and the second cyan ink composition with lower color density contains 0.4 to 1.5% by weight of the compound represented by formula (V).

13. The ink set according to claim 7, wherein the hue (a*, b*) is in the range of (−20 to 20, 60 to 110) for the yellow ink composition, in the range of (50 to 90, −20 to 10) for the first magenta ink composition with higher color density, in the range of (10 to 40, −10 to 10) for the second magenta ink composition with lower color density, in the range of (−50 to −30, −60 to −40) for the first cyan ink composition with higher color density, and in the range of (−30 to −10, −30 to −10) for the second cyan ink composition with lower color density.

14. An ink set comprising a yellow ink composition, a magenta ink composition, and a cyan ink composition, said yellow ink composition containing as a colorant the compound represented by formula (I) and/or the compound represented by formula (II),

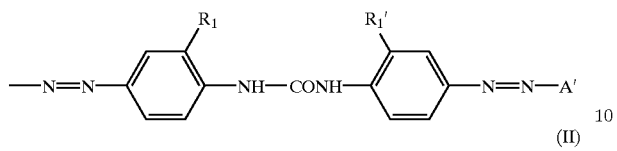
(I)

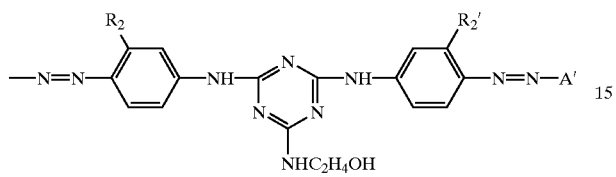
(II)

wherein
$R_1$, $R_1'$, $R_2$, and $R_2'$ each independently represent $CH_3$ or $OCH_3$; and
A and A' each independently represent a group having a structure selected from the group consisting of

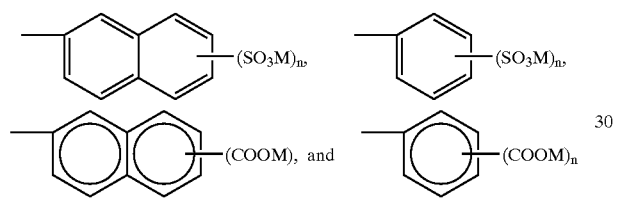

wherein
M represents a hydrogen atom, lithium, sodium, potassium, ammonium, or an organic amine; and
n is an integer of 1 or 2,
said magenta ink composition containing as a colorant (b) the compound represented by formula (III)

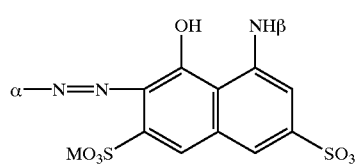
(III)

wherein
α represents a $C_1$–$C_4$ alkyl or alkoxy group or an OH—, $SO_3H$—, or COOM-substituted phenyl or naphthyl group;
β represents a hydrogen atom or a group represented by formula

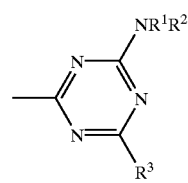

wherein
$R^1$ represents a hydrogen atom or an OH— or COOH-substituted $C_1$–$C_4$ alkyl group, $R^2$ represents an OH—, $OCH_3$—, $OC_2H_5$—, $SO_3M$—, or COOM-substituted $C_1$–$C_4$ alkyl or phenyl group, and
$R^3$ represents an OH, COOH, or $NHR^4$ wherein $R^4$ represents an $SO_3M$— or COOH-substituted $C_1$–$C_4$ alkyl group; and
M represents a hydrogen atom, lithium, sodium, potassium, ammonium, or an organic amine,
and/or (b) the compound represented by formula (IV)

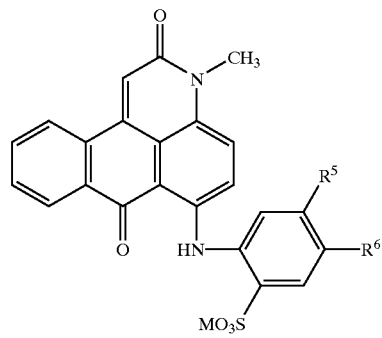
(IV)

wherein
M represents a hydrogen atom, lithium, sodium, potassium, ammonium, or an organic amine;
$R^5$ represents a hydrogen atom, a chlorine atom or a group represented by formula

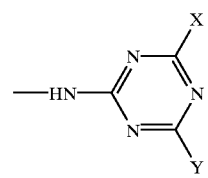

wherein
X represents an anilino group substituted by at least one $SO_3M$ and
Y represents OH, a chlorine atom, or a morpholino group; and
$R^6$ represents a hydrogen atom, a chlorine atom, $SO_3M$, or a $C_1$–$C_4$ alkyl group,
said cyan ink composition containing as a colorant the compound represented by formula (V)

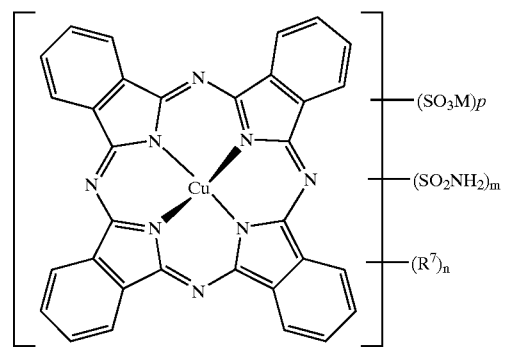
(V)

wherein
$R^1$ represents OH, COOM, or $R^8$COOM wherein $R^8$ represents a $C_4$–$C_9$ akyl group; and
p, m, and n are each 0 to 4 with (p+m+n)=4.

15. The ink set according to claim 14, wherein the yellow ink composition contains as the colorant 0.3 to 4.0% by weight in total of the compound represented by formula (I) and/or the compound represented by formula (II), the magenta ink composition contains as the colorant 1.0 to 4.0% by weight in total of the compound represented by formula (III) and/or the compound represented by formula (IV), and the cyan ink composition contains as the colorant 1.0 to 4.0% by weight of the compound represented by formula (V).

16. The ink set according to claim 14, wherein the magenta ink composition contains the compound represented by formula (III) and the compound represented by formula (IV) in a weight ratio of 1:1 to 1:5.

17. The ink set according to claim 11, wherein the hue ($a^*$, $b^*$) is in the range of (−20 to 20, 60 to 110) for the yellow ink composition, in the range of (50 to 90, −20 to 10) for the magenta ink composition, and in the range of (−50 to −30, −60 to −40) for the cyan ink composition.

18. The ink set according claim 6, which further comprises a black ink composition.

19. The ink set according to claim 6, wherein each of the first magenta, second magenta, yellow and cyan ink compositions further comprises a surfactant.

20. A method for recording comprising:
(a) providing the ink set according to claim 1; and
(b) depositing onto a recording medium to perform printing each of the first magenta and second magenta ink compositions.

21. A method for ink jet recording comprising:
(a) providing the ink set according to claim 1; and
(b) ejecting droplets of each of the first magenta and second magenta ink compositions and depositing the droplets onto a recording medium to perform printing.

22. A record produced by the recording method of claim 20.

23. A method for recording comprising:
(a) providing the ink set according to claim 7; and
(b) depositing onto a recording medium to perform printing each of the yellow, first magenta, second magenta, first cyan and second cyan ink compositions.

24. A method for ink jet recording comprising:
(a) providing the ink set according to claim 7; and
(b) ejecting droplets of each of the yellow, first magenta, second magenta, first cyan and second cyan ink compositions and depositing the droplets onto a recording medium to perform printing.

25. A record produced by the recording method of claim 23.

26. A method for recording comprising:
(a) providing the ink set according to claim 14; and
(b) depositing onto a recording medium to perform printing each of the yellow, magenta and cyan ink compositions.

27. A method for ink jet recording comprising:
(a) providing the ink set according to claim 14; and
(b) ejecting droplets of each of the yellow, magenta and cyan ink compositions and depositing the droplets onto a recording medium to perform printing.

28. A record produced by the recording method of claim 26.

* * * * *